(12) United States Patent
Suzuki

(10) Patent No.: US 9,916,739 B2
(45) Date of Patent: Mar. 13, 2018

(54) COMMUNICATION ADAPTER AND ELECTRIC WORKING MACHINE SYSTEM

(71) Applicant: MAKITA CORPORATION, Anjo-shi, Aichi (JP)

(72) Inventor: Hitoshi Suzuki, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 15/391,165

(22) Filed: Dec. 27, 2016

(65) Prior Publication Data

US 2017/0193761 A1 Jul. 6, 2017

(30) Foreign Application Priority Data

Jan. 6, 2016 (JP) ................................. 2016-001208

(51) Int. Cl.
  *G08B 1/08* (2006.01)
  *B25F 5/00* (2006.01)
  *H04B 1/03* (2006.01)

(52) U.S. Cl.
  CPC .................. *G08B 1/08* (2013.01); *B25F 5/00* (2013.01); *H04B 1/03* (2013.01)

(58) Field of Classification Search
  CPC ................ G08B 1/08; B25F 5/00; H04B 1/03
  USPC ....... 340/539.1, 12.5, 539.11, 542; 455/74.1, 455/425
  See application file for complete search history.

(56) References Cited

U.S. PATENT DOCUMENTS

| 2010/0096151 | A1  | 4/2010 | Ostling |
| 2014/0151079 | A1* | 6/2014 | Furui ........................ B25F 5/02 173/46 |
| 2014/0159640 | A1* | 6/2014 | Yoshikawa ........... H02J 7/0044 320/103 |
| 2014/0159662 | A1  | 6/2014 | Furui et al. |
| 2014/0159920 | A1  | 6/2014 | Furui et al. |
| 2014/0284070 | A1  | 9/2014 | Ng et al. |
| 2015/0187198 | A1  | 7/2015 | Silverberg et al. |

(Continued)

FOREIGN PATENT DOCUMENTS

| DE | 10 2013 222313 A1 | 5/2015 |
| EP | 2 072 192 A1 | 6/2009 |
| JP | 2014-525840 A | 10/2014 |

(Continued)

OTHER PUBLICATIONS

May 10, 2017 Search Report issued in European Patent Application No. 16207361.3.

*Primary Examiner* — Dhaval Patel
(74) *Attorney, Agent, or Firm* — Oliff PLC

(57) ABSTRACT

A communication adapter in one aspect of the present disclosure comprises a plurality of outer surfaces comprising at least two outer surfaces, an interface device, an antenna, and a transmission device. The interface device is provided at at least one outer surface of the at least two outer surfaces and electrically coupled to an electric working machine through the at least one outer surface. The antenna is provided at another at least one outer surface, which is different from the at least one outer surface, among the plurality of outer surfaces, and configured to be capable of transmitting a radio wave for wireless communication with a communication device other than the electric working machine from the another at least one outer surface.

11 Claims, 13 Drawing Sheets

(56) References Cited

U.S. PATENT DOCUMENTS

2016/0311094 A1* 10/2016 Mergener .................. B25F 5/00

FOREIGN PATENT DOCUMENTS

| WO | 01/05559 A2 | 1/2001 |
| WO | 2008/088266 A1 | 7/2008 |
| WO | 2013/014914 A2 | 1/2013 |
| WO | 2013/014915 A2 | 1/2013 |

* cited by examiner

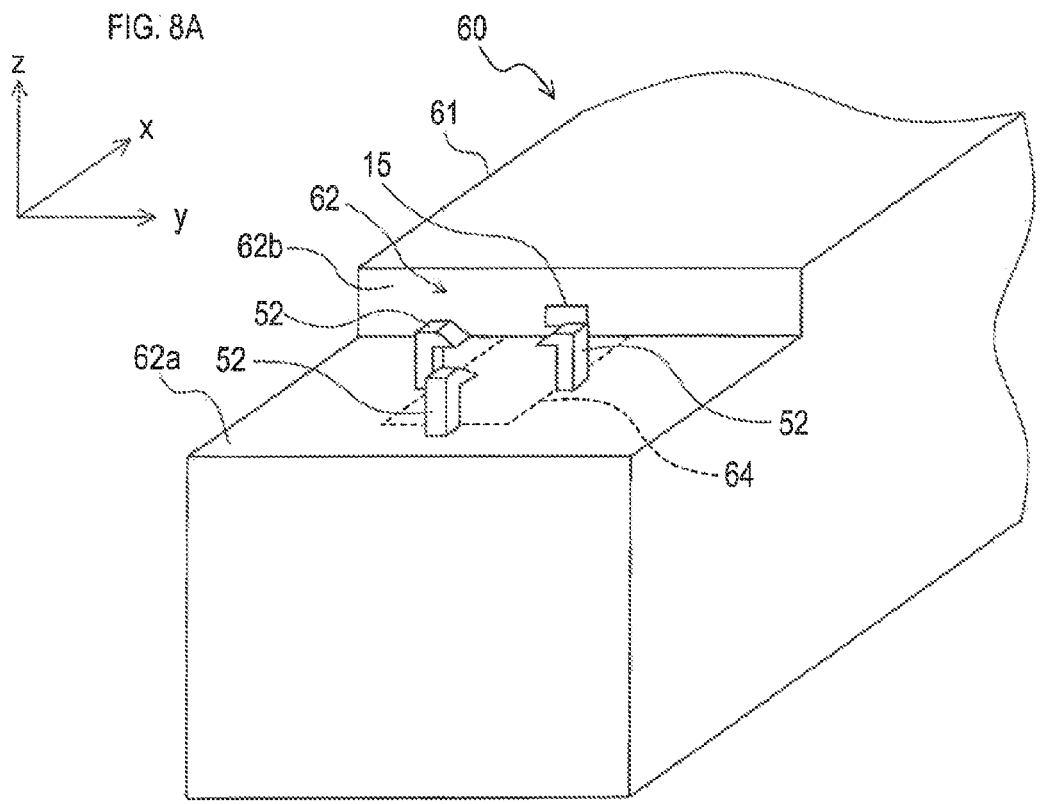
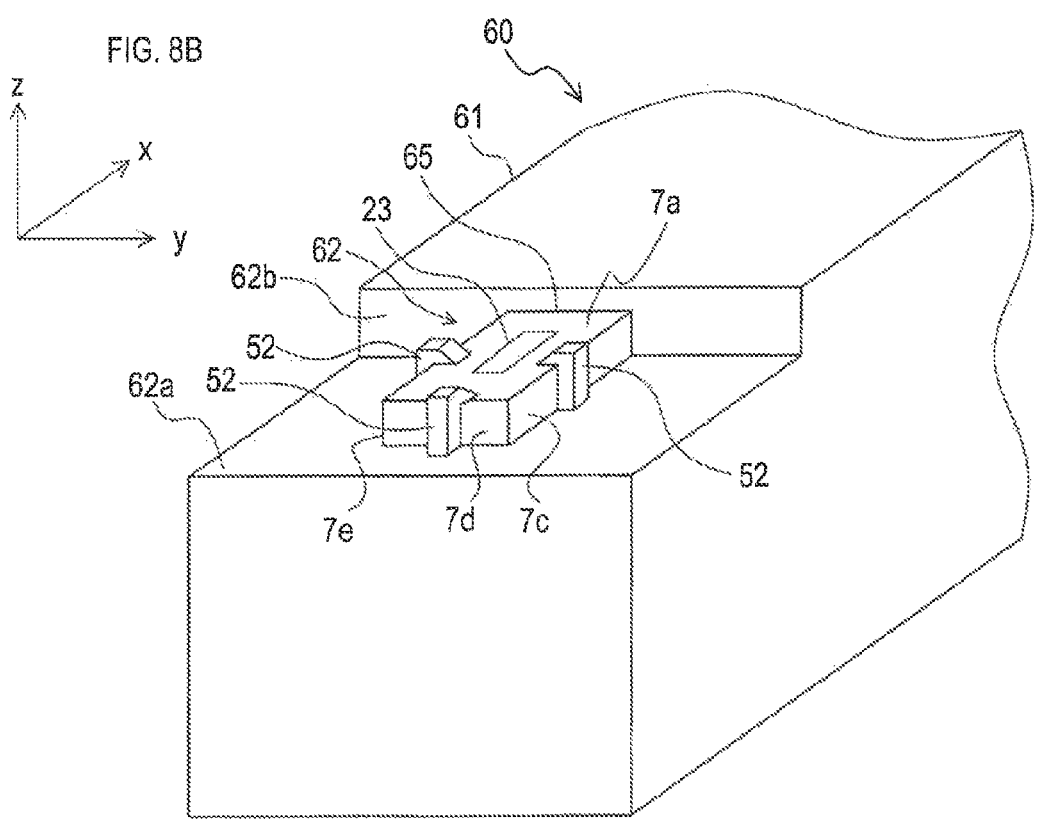

COMMUNICATION ADAPTER AND ELECTRIC WORKING MACHINE SYSTEM

CROSS-REFERENCE TO RELATED APPLICATIONS

This application claims the benefit of Japanese Patent Application No. 2016-001208 filed on Jan. 6, 2016 with the Japan Patent Office, the disclosure of which is incorporated herein by reference.

BACKGROUND

The present disclosure relates to a communication adapter to be attached to an electric working machine, and an electric working machine system that comprises an electric working machine and a communication adapter.

Known electric working machines for performing machining, cutting, drilling, or other operations of a workpiece includes an electric working machine to which an adapter capable of wireless communication with an external device is attachable. Japanese Translation of PCT International Application Publication No. 2014-525840 discloses an adapter for wireless communication that is attached between a body of an electric power tool and a battery pack. The adapter wirelessly transmits, to an external device, various information, such as a remaining energy of a battery and an operating state of the electric power tool.

SUMMARY

The aforementioned adapter is held between the electric power tool body and the battery pack. Thus, stable attachment of the adapter to the electric power tool body is possible, but good usability of the adapter cannot be achieved due to troublesome attachment and detachment actions of the adapter.

Also, in a state where outer surfaces of the adapter are hardly externally exposed since the adapter is held between the electric power tool body and the battery pack, radio waves transmitted and received by the adapter may be obstructed by the electric power tool body or the battery pack, resulting in an adverse influence on wireless communication quality.

In one aspect of the present disclosure, it is desirable to provide a technique that enables stable attachment of a communication adapter to an electric working machine and also achieves good attachability and detachability as well as good wireless communication performance of the communication adapter.

A communication adapter in one aspect of the present disclosure comprises a plurality of outer surfaces comprising at least two outer surfaces, an interface device, an antenna, and a transmission device.

Each of the at least two outer surfaces is configured to face a corresponding one of at least two surfaces of a recess for attachment thereto of the communication adapter when the communication adapter is attached to the recess, the recess being provided in an outer surface of an electric working machine. The electric working machine is configured to drive a working element by an electric power.

The interface device is provided at at least one outer surface of the at least two outer surfaces, and configured to be electrically coupled to the electric working machine through the at least one outer surface.

The antenna is provided at another at least one outer surface, which is different from the at least one outer surface, among the plurality of outer surfaces, and configured to be capable of transmitting a radio wave for wireless communication with a communication device other than the electric working machine from the another at least one outer surface.

The transmission device is configured to acquire machine information indicating a state of the electric working machine and to transmit the acquired machine information to the communication device through the antenna.

Providing the interface device at the at least one outer surface may include providing the interface device so as to be flush with the at least one outer surface, providing the interface device so as to protrude from the at least one outer surface, and providing the interface device in a vicinity of the at least one outer surface inside the communication adapter. In other words, the interface device may be provided so as to successfully establish an electrical coupling to the electric working machine through the at least one outer surface.

Similarly, providing the antenna at the another at least one outer surface may include providing the antenna so as to be flush with the another at least one outer surface, providing the antenna so as to protrude from the another at least one outer surface, and providing the antenna in a vicinity of the another at least one outer surface inside the communication adapter. In other words, the antenna may be provided so as to successfully perform transmission and reception of a radio wave through the another at least one outer surface.

According to the communication adapter configured as mentioned above, when the communication adapter is attached to the recess of the electric working machine, the at least two outer surfaces of the communication adapter face at least two surfaces of the recess. Accordingly, the at least two outer surfaces can be held directly or indirectly by the at least two surfaces of the recess. Also, since the recess is provided in the outer surface of the electric working machine, the communication adapter configured to be attachable to the recess leads to easy attachment and detachment to and from the recess.

Further, the interface device is provided at the at least one outer surface facing the recess, whereas the antenna is provided at the another at least one outer surface, which is different from the at least one outer surface. Since the interface device is to be electrically coupled to the electric working machine, the at least one outer surface at which the interface device is provided is more likely to be covered by the recess as compared with other outer surfaces when the communication adapter is attached to the recess. Thus, by providing the antenna at a different outer surface from the at least one outer surface, a good radio wave transmission to the communication device can be achieved at least as compared with a case of providing the antenna at the same outer surface as the at least one outer surface.

Accordingly, the communication adapter can be attached stably to the electric working machine and also can achieve good attachability and detachability as well as good wireless communication performance.

The another at least one outer surface may be oriented so as not to face the recess when the communication adapter is attached to the recess. In this case, the antenna is arranged at an outer surface not facing any surface of the recess, a better transmission and reception of a radio wave to and from the communication device can be achieved.

The communication adapter may further comprise a restriction member configured to restrict detachment of the communication adapter from the recess. By providing the restriction member, it is possible to inhibit the communication adapter attached to the recess from being detached from the recess.

The interface device may be configured to be electrically coupled to the electric working machine by a contactless power supply system. By employing the contactless power supply system, occurrence of physical breakage of the interface device can be inhibited, thus achieving an improved reliability of the electrical coupling to the electric working machine through the interface device.

The electric working machine may be configured to be capable of outputting an electric power for operation of the communication adapter to the interface device of the communication adapter by the contactless power supply system. In this case, the communication adapter may comprise a power obtaining device configured to obtain the electric power outputted from the electric working machine through the interface device. The communication adapter that comprises the power obtaining device can obtain the electric power for operation of the communication adapter from the electric working machine and operate by the obtained electric power.

The electric working machine may be configured to be capable of outputting the machine information to the interface device of the communication adapter by the contactless power supply system. In this case, the communication adapter may comprise an information acquisition device configured to acquire the machine information outputted from the electric working machine through the interface device. The communication adapter with such configuration can easily acquire the machine information from the electric working machine.

An electric working machine system in another aspect of the present disclosure comprises an electric working machine configured to drive a working element by an electric power and a communication adapter comprising a plurality of outer surfaces and configured to be attachable to and detachable from the electric working machine.

The electric working machine comprises a recess arranged at an outer surface of the electric working machine and configured for attachment thereto of the communication adapter, and a machine-side interface device. The recess comprises at least two facing surfaces, and each of the at least two facing surfaces is configured to face a corresponding one of at least two outer surfaces of the communication adapter when the communication adapter is attached to the recess. The machine-side interface device is configured to be electrically coupled to the communication adapter. Similarly, as described above, the communication adapter comprises a plurality of outer surfaces, an adapter-side interface device, an antenna, and a transmission device.

According to the electric working machine system configured as described above, good attachability and detachability of the communication adapter can be achieved, while stable attachment of the communication adapter to the electric working machine is enabled, and also a good wireless communication performance can be achieved in a state where the communication adapter is attached to the electric working machine.

Similarly as described above, in the electric working machine system with such configuration, the antenna of the communication adapter may be provided at at least one outer surface not facing the recess, and the electric working machine system may further comprise a restriction member configured to restrict detachment of the communication adapter from the recess.

Moreover, the electric working machine system may further comprise an inner elastic member having an elastic force. The inner elastic member is provided between at least one of the at least two facing surfaces and at least one of the at least two outer surfaces, and configured to elastically support the communication adapter with respect to the electric working machine.

According to the electric working machine system configured as described above, the communication adapter is elastically supported by the inner elastic member with respect to the electric working machine. Thus, it is possible to inhibit application of a physical impact on the communication adapter by the electric working machine.

In a case where the electric working machine system comprises the inner elastic member, the restriction member and the inner elastic member may be provided such that the communication adapter abuts the restriction member by the elastic force of the inner elastic member, and thereby the communication adapter is attached to the recess in a state of receiving the elastic force of the inner elastic member and a reaction force from the restriction member caused by the elastic force.

Specifically, the inner elastic member and the restriction member are not arranged separately from each other, but arranged such that the communication adapter is pressed on the restriction member by the elastic force of the inner elastic member, and thereby the communication adapter receives the reaction force from the restriction member. With such configuration, the communication adapter is held between the inner elastic member and the restriction member and elastically supported. Accordingly, if a backlash occurs between the recess of the electric working machine and the communication adapter, at least part of the backlash can be absorbed, thereby enabling more stable attachment of the communication adapter to the electric working machine.

The restriction member may face one of the plurality of outer surfaces. In this case, the restriction member may comprise an outer elastic member configured to elastically support the communication adapter by applying an elastic force on the one of the plurality of outer surfaces. In this case, the outer elastic member, which is interposed between the restriction member and the communication adapter, can absorb at least part of the backlash between the recess of the electric working machine and the communication adapter, thereby enabling more stable attachment of the communication adapter to the electric working machine.

The restriction member may have a plate-shape. Also, the antenna may be provided at the one of the plurality of outer surfaces. In this case, the restriction member may comprise a surface area facing the antenna and at least partially comprising at least one through hole. According to such configuration, transmission and reception of a radio wave by the antenna can be performed through the at least one through hole, thus achieving a further improvement in wireless communication quality.

BRIEF DESCRIPTION OF THE DRAWINGS

Hereinafter, some embodiments of the present disclosure will be described by way of example with reference to the accompanying drawings, in which:

FIG. 8A is a perspective view showing a vicinity of a recess in a machine body of the fourth embodiment;

FIG. 8B is a perspective view showing a state where the communication adapter is attached to the recess in the machine body of the fourth embodiment;

DETAILED DESCRIPTION OF THE PREFERRED EMBODIMENTS

First Embodiment

(1) Overall Configuration of Machine Communication System

Figure 1:
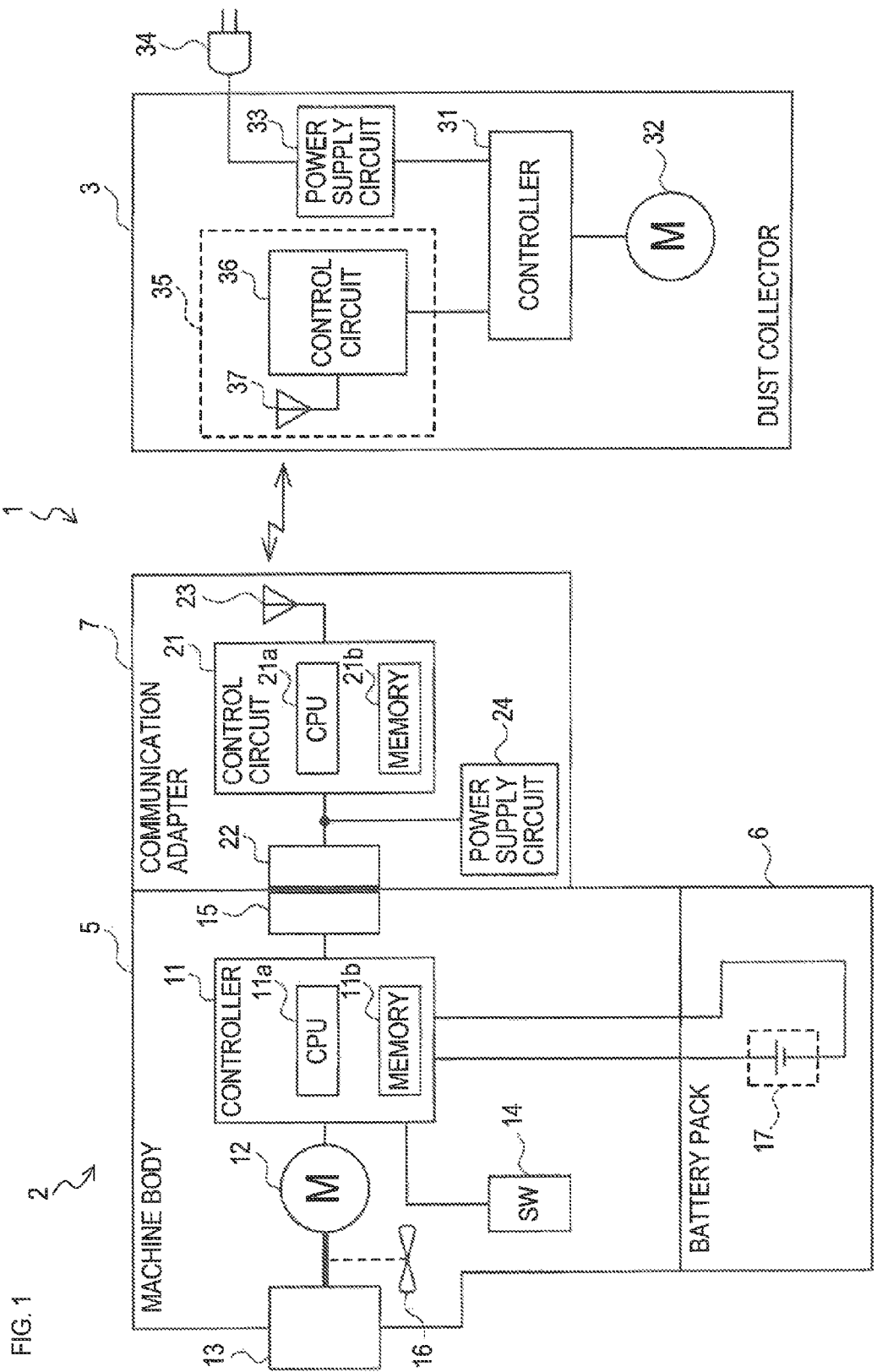
FIG. 1 is a block diagram showing an overall configuration of a machine communication system of a first embodiment.

As shown in FIG. 1, a machine communication system 1 of the present embodiment comprises an electric working machine 2, a dust collector 3, and a communication adapter 7. The electric working machine 2 of the present embodiment is configured as an electric power tool, such as a grinder, a circular saw, and a driver drill, which generates dust and machining chips during use. The machine communication system 1 of the present embodiment is configured to cause the dust collector 3 to perform an interlocking operation during an operation of the electric working machine 2, to thereby cause the dust collector 3 to automatically suction dust and machining chips generated by use of the electric working machine 2.

The electric working machine 2 comprises a machine body 5 and a battery pack 6. The battery pack 6 comprises a battery 17 that is repeatedly rechargeable. Individual components in the machine body 5 operate receiving electric power supply from the battery 17.

The battery 17 of the present embodiment is, for example, a lithium iron rechargeable battery. However, the battery 17 may be a rechargeable battery other than a lithium iron rechargeable battery. Also, the battery pack 6 is attachable to and detachable from the machine body 5. By detaching the battery pack 6 from the electric working machine 2 and attaching the battery pack 6 to a charger (not-shown), the battery 17 inside the battery pack 6 can be charged. The battery 17 may be installed in the machine body 5. In this case, it may be configured such that, for example, the battery 17 is charged by coupling a charging cable to the machine body, or the battery 17 is removed from the machine body 5 and charged.

The communication adapter 7 is configured to be attachable to and detachable from the machine body 5. When receiving in-operation information transmitted from the machine body 5 while the electric working machine 2 is in operation, the communication adapter 7 performs wireless transmission of the in-operation information itself or its converted information to the dust collector 3.

Information to be transmitted wirelessly from the communication adapter 7 to the dust collector 3 when in-operation information is received from the machine body 5 comprises an interlocking command. The interlocking command directly is a command to cause the dust collector 3 to perform an interlocking operation of the dust collector 3 while the electric working machine 2 is in operation, whereas indirectly is information indicating that the electric working machine 2 is in operation. When an interlocking command is transmitted wirelessly from the communication adapter 7 to the dust collector 3, interlocking operation of the dust collector 3 is performed.

The machine body 5 of the electric working machine 2 comprises a controller 11, a motor 12, an operation unit 13, a trigger switch 14, a machine-side interface 15, and a fan 16. The interface is hereinafter simply referred to as an "IF."

The electric working machine 2 comprises a not-shown trigger operating portion. The trigger operating portion is an operation switch configured to receive an operation to operate or stop the electric working machine 2 by a user of the electric working machine 2.

The trigger switch 14 is turned on or off in accordance with a state of the trigger operating portion. When the user performs a specified ON operation (for example, a pulling operation) on the trigger operating portion, the trigger switch 14 is turned on in an interlocking manner. Thereafter, when the user performs a specified OFF operation (for example, a returning operation) on the trigger operating portion, the trigger switch 14 is turned off in an interlocking manner. An operation signal indicating an on/off state of the trigger switch 14 is inputted from the trigger switch 14 to the controller 11.

When the trigger switch 14 is turned on, the controller 11 drives the motor 12, and outputs in-operation information and an electric power for operation of the communication adapter 7 to the communication adapter 7 through a machine-side IF 15. As a result, an interlocking command is transmitted wirelessly from the communication adapter 7 to the dust collector 3, causing interlocking operation of the dust collector 3.

The controller 11 comprises a microcomputer that comprises a CPU 11a and a memory 11b. The memory 11b comprises a semiconductor memory, such as a RAM, a ROM, and a flash memory. The memory 11b stores various programs and data, in order to achieve various functions of the electric working machine 2. The various functions provided to the electric working machine 2 can be achieved through execution of various programs stored in the memory 11b by the CPU 11a.

The various functions achieved by the controller 11 are not limited to a software process as mentioned above, but a part of, or all of, the functions may be achieved using hardware obtained by a combination of logic circuits, analog circuits, and others.

When the motor 12 is driven by the controller 11, its rotational driving force is transmitted to the operation unit 13, and the operation unit 13 is driven. The operation unit 13 comprises a working element that directly acts on a target for working to thereby achieve a desired work, and a transmission mechanism to transmit the rotational driving force of the motor 12 to the working element. If the electric working machine 2 is, for example, a circular saw, the working element is, for example, a saw blade. If the electric working machine 2 is, for example, a grinder, the working element is, for example, a grinding wheel.

The rotational driving force of the motor 12 is also transmitted to the fan 16, and the fan 16 is rotated by the rotational driving force. The fan 16 is provided mainly for the purpose of blowing air on the motor 12 to cool the motor 12.

The machine-side IF 15 is a coupling circuit to electrically couple the machine body 5 and the communication adapter 7. More specifically, the machine-side IF 15 is electrically coupled to an adapter-side IF 22 provided to the communication adapter 7.

In the present embodiment, both of electric power and information are transmitted through the machine-side IF 15 and the adapter-side IF 22. Specifically, electric power for operation of the communication adapter 7 and the aforementioned in-operation information is outputted from the machine body 5 through the machine-side IF 15.

Electrical coupling of the machine-side IF 15 and the adapter-side IF 22 is established by a contactless power supply system in the present embodiment. The contactless power supply system includes various known systems, such as an electromagnetic induction system, a magnetic field resonance system, an electric field coupling system, and a radio wave system. In the present embodiment, one of these systems (for example, the electromagnetic induction system) is used.

The communication adapter 7 comprises a control circuit 21, the adapter-side IF 22, an antenna 23, and a power supply circuit 24. The adapter-side IF 22 is a coupling circuit to electrically couple the communication adapter 7 and the machine body 5 by the contactless power supply system. When in-operation information outputted from the machine-side IF 15 of the machine body 5 is received at the adapter-side IF 22, the in-operation information is inputted to the control circuit 21. Also, when an electric power for operation outputted from the machine-side IF 15 of the machine body 5 is received at the adapter-side IF 22, the electric power for operation is inputted to the power supply circuit 24.

When the electric power for operation is inputted from the machine body 5 through the adapter-side IF 22, the power supply circuit 24 generates an internal electrical source power for operating individual components in the communication adapter 7, including the control circuit 21, based on the electric power for operation, and supplies the internal electrical source power to the individual components. The individual components in the communication adapter 7 operate on the internal electrical source power.

When the in-operation information is inputted from the machine body 5 through the adapter-side IF 22, the control circuit 21 performs wireless transmission from the antenna 23 of information, including at least the aforementioned interlocking command, based on the in-operation information. This causes an interlocking operation of the dust collector 3. The wireless communication with the dust collector 3 through the antenna 23 is performed by a wireless communication system using, for example, a radio wave of 2.4 GHz band in the present embodiment.

The control circuit 21 comprises a microcomputer that comprises a CPU 21a and a memory 21b. The memory 21b comprises a semiconductor memory, such as a RAM, a ROM, and a flash memory. The memory 21b stores various programs and data to achieve various functions of the communication adapter 7. The various functions of the communication adapter 7 are achieved by execution of the various programs stored in the memory 21b by the CPU 21a. The various functions achieved by the control circuit 21 are not limited to a software process, but a part of, or all of, the functions may be achieved using hardware obtained by a combination of logic circuits, analog circuits, and others.

The dust collector 3, which is capable of suctioning dust and machining chips discharged as a result of a work by the electric working machine 2 through a dust collection hose (not-shown), comprises a controller 31, a motor 32, a power supply circuit 33, a plug 34, and a communication unit 35.

The motor 32 is provided to drive a suction fan (not-shown). The power supply circuit 33 receives an alternating current power supplied from a commercial power supply through the plug 34, and generates an electrical source power to operate individual components in the dust collector 3, including the controller 31 and the communication unit 35, based on the alternating current power, and supplies the electrical source power to the individual components. The configuration where the dust collector 3 externally receives an alternating current power and operates is merely an example, and the dust collector 3 may have a configuration to operate by receiving an electric power for operation by other method (for example, a configuration to receive a direct current power from the battery pack to thereby operate).

The communication unit 35 comprises a control circuit 36 and an antenna 37. The control circuit 36 controls wireless communication through the antenna 37. When receiving a transmission signal wirelessly transmitted from the communication adapter 7 through the antenna 37, the control circuit 36 outputs information included in the transmission signal to the controller 31. In a case where the transmission signal includes an interlocking command, the interlocking command is outputted to the controller 31.

The controller 31 comprises a microcomputer that comprises a CPU and a memory in a similar manner as the controller 11 of the electric working machine 2, and achieves various functions in the dust collector 3. When the operation switch (not-shown) is turned on by a user of the dust collector 3, the controller 31 drives the motor 32. That is, operation of the dust collector 3 is started to suction dust and machining chips.

Also, when receiving an interlocking command wirelessly transmitted from the communication adapter 7 through the communication unit 35, the controller 31 drives the motor 32 to thereby cause an interlocking operation of the dust collector 3 with the electric working machine 2.

(2) Configuration to Attach Communication Adapter to Machine Body

Next, a description will be given of specifically how the communication adapter 7 is attached to the machine body 5 of the electric working machine 2 with reference to FIG. 2 and FIG. 3.

Figure 2:
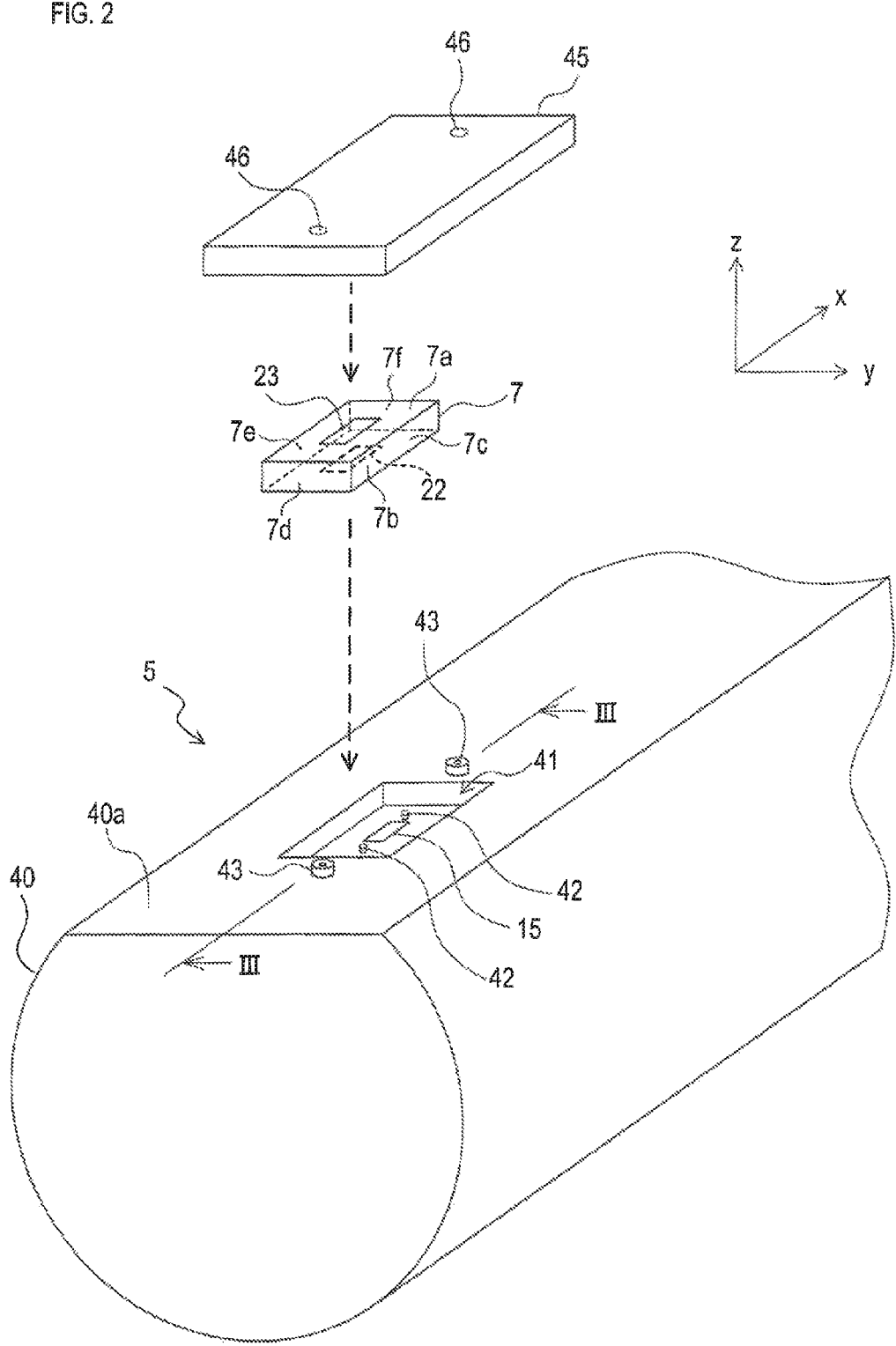
FIG. 2 is a perspective view showing a vicinity of a recess in a machine body and a communication adapter in the first embodiment.
Figure 3:
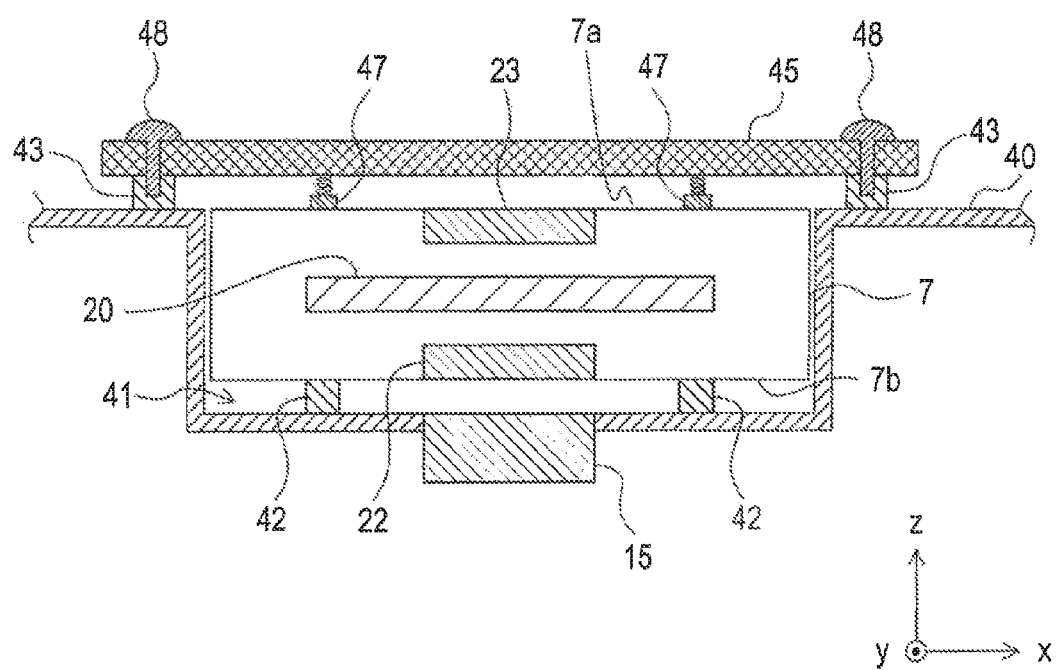
FIG. 3 is a sectional view taken along a line III-III in FIG. 2 and showing a cross-section in a state where the communication adapter is attached to the machine body.

As shown in FIG. 2 and FIG. 3, the machine body 5 of the electric working machine 2 comprises a housing 40. The housing 40 contains various components, including the controller 11, the motor 12, and the machine-side IF 15. FIG. 2 illustrates a part, including an end portion, of the whole of the housing 40.

In the present embodiment, the housing 40 is described as having a generally cylindrical shape as shown in FIG. 2 for the purpose of simplicity. Also, as shown in FIG. 2 and FIG. 3, three axis directions of x, y, and z are defined with respect to the electric working machine 2. The x-axis direction is a longitudinal direction of the housing 40, that is, an axial direction of the housing 40 having a generally cylindrical shape. The z-axis direction is a direction perpendicular to a bottom surface, at which the machine-side IF 15 is disposed, of a recess 41 provided to the housing 40. The x-axis direction is parallel to the bottom surface. The y-axis direction is a direction perpendicular to an x-z plane.

Among all outer surfaces of the electric working machine 2, an adapter attachment surface 40a of the housing 40 having a planar shape comprises the recess 41. The recess 41 is configured for attachment thereto of the communication adapter 7. The communication adapter 7 is inserted into and attached to the recess 41. The recess 41 is shaped such that a partial area of the adapter attachment surface 40a is cut out in a generally rectangular parallelepiped shape, and comprises total five surfaces, including a bottom surface (that is, a surface parallel to an x-y plane) and four wall surfaces perpendicular to the bottom surface.

The machine-side IF 15 is provided in a generally central area of the bottom surface of the recess 41. In the present embodiment, the machine-side IF 15 is arranged such that an end surface of the machine-side IF 15 is flush with the bottom surface of the recess 41 as shown in FIG. 3. This arrangement manner, however, is merely an example, and the machine-side IF 15 may be arranged more inside of the housing 40 than the bottom surface of the recess 41 so as not to be directly flush with the bottom surface of the recess 41. That is, it is sufficient if the machine-side IF 15 can transmit electric power and information to the adapter-side IF 22 of the communication adapter 7 through the bottom surface of the recess 41 by a contactless power supply system.

Elastic supporting portions 42 are provided at both ends in the x-axis direction of the area where the machine-side IF 15 is provided in the bottom surface of the recess 41. The elastic supporting portions 42 are each a member capable of generating an elastic force. The elastic supporting portions 42 are each provided to elastically support the communication adapter 7 without allowing direct contact of the communication adapter 7 with the bottom surface of the recess 41. It may be appropriately determined specifically what is to be used for the elastic supporting portions 42. For example, a member comprising a spring, a member comprising a sponge, or a member comprising soft rubber may be used.

Screw receivers 43 are provided on the adapter attachment surface 40a of the housing 40 at both ends of the recess 41 in the x-axis direction. Each of the screw receivers 43 is a female screw member to screw-fasten a cover 45 by a screw 48.

The communication adapter 7 has a generally rectangular parallelepiped shape with six outer surfaces. Specifically, the communication adapter 7 comprises a casing with at least six outer surfaces of an upper surface 7a, a lower surface 7b, and four side surfaces 7c, 7d, 7e, and 7f, and the casing houses various components.

Among the components housed in the aforementioned casing, that is, the communication adapter 7, the antenna 23 is provided on an upper surface 7a side. Specifically, it is configured such that the antenna 23 can radiate a radio wave through the upper surface 7a. In the present embodiment, the antenna 23 is arranged such that some end surface thereof is flush with the upper surface 7a as shown in FIG. 3. However, this arrangement manner is merely an example, and the antenna 23 may be arranged more inside of the casing than the upper surface 7a so as not to be flush with the upper surface 7a. That is, it is sufficient if the antenna 23 can successfully transmit and receive a radio wave through the upper surface 7a.

Among the components housed in the communication adapter 7, the adapter-side IF 22 is provided on a lower surface 7b side. In the present embodiment, the adapter-side IF 22 is arranged such that some end surface of the adapter-side IF 22 is flush with a lower surface 7b as shown in FIG. 3. However, this arrangement manner is merely an example, and the adapter-side IF 22 may be arranged more inside of the casing than the lower surface 7b so as not to be flush with the lower surface 7b. That is, it is sufficient if the adapter-side IF 22 can receive, through the lower surface 7b, and normally process the electric power and information transmitted from the machine-side IF 15 of the electric working machine 2 by the contactless power supply system.

When attaching the communication adapter 7 to the recess 41, the communication adapter 7 is first inserted into the recess 41 such that the lower surface 7b of the communication adapter 7 faces the bottom surface of the recess 41. Then, after the insertion, the communication adapter 7 is covered with the cover 45, and the cover 45 is screw-fastened to the electric working machine 2. The cover 45 of the present embodiment is non-metal (for example, made of resin), and has a plate shape. The cover 45 is used to restrict the communication adapter 7 inserted into the recess 41 from being detached from the recess 41 to retain the communication adapter 7 in the recess 41.

The cover 45 comprises screw holes 46 arranged corresponding to respective positions of the screw receivers 43 in the housing 40. Accordingly, by placing the cover 45 such that the respective screw holes 46 of the cover 45 and the respective screw receivers 43 of the housing 40 are aligned, and inserting screws 48 into the respective screw holes 46 and performing screw-fastening, the cover 45 can be secured to the housing 40. The screw receivers 43 are not necessarily required to protrude from the adapter attachment surface 40a, but may be, for example, embedded in the housing 40 so as not to protrude from the adapter attachment surface 40a. In this case, when the cover 45 is fastened by screws 48, the cover 45 is secured to the adapter attachment surface 40a in an abutting state.

When attachment of the communication adapter 7 is completed as described above, the recess 41 of the housing 40, the communication adapter 7, and the cover 45 have a positional relationship as shown in FIG. 3. As shown in FIG. 3, when the communication adapter 7 is attached to the recess 41, the lower surface 7b of the communication adapter 7 is elastically supported by the two elastic supporting portions 42 in the recess 41.

Also, two elastic pressing portions 47 are provided along the x-axis direction on a surface of the cover 45 facing the communication adapter 7. Accordingly, the upper surface 7a of the communication adapter 7 is biased in a bottom surface direction of the recess 41 by elastic forces of the elastic pressing portions 47.

That is, the communication adapter 7 is attached in a state where the communication adapter 7 indirectly abuts (that is, abuts through the elastic pressing portions 47) the cover 45 by the elastic forces of the elastic supporting portions 42 provided on the bottom surface of the recess 41, thereby receiving biasing forces from the elastic supporting portions 42 and a reaction force from the cover 45 caused by the biasing forces. In the present embodiment, the upper surface 7a of the communication adapter 7 does not directly abut the cover 45, and the elastic pressing portions 47 are interposed therebetween; thus, the communication adapter 7 is elastically supported from both sides of the bottom surface of the recess 41 and the cover 45.

When the communication adapter 7 is attached to the recess 41, the bottom surface of the recess 41 and the lower surface 7b of the communication adapter 7 face each other as shown in FIG. 3. At the same time, the machine-side IF 15 and the adapter-side IF 22 face each other. As a result, it is possible to achieve good electrical coupling between the machine-side IF 15 and the adapter-side IF 22, thus enabling good transmission and reception of the electric power and information by the contactless power supply system therebetween.

Also, when the communication adapter 7 is attached to the recess 41, the four side surfaces 7c, 7d, 7e, and 7f among the six outer surfaces of the communication adapter 7 face the respective corresponding four wall surfaces of the recess 41, whereas the upper surface 7a with the antenna 23 does not face any surface of the recess 41. The four side surfaces 7c, 7d, 7e, and 7f of the communication adapter 7 may abut, or be separate from, the respective corresponding facing wall surfaces of the recess 41. Further, an elastic member may be provided between at least one of the four side surfaces 7c, 7d, 7e, and 7f and its corresponding facing wall surface of the recess 41.

As shown in FIG. 3, a circuit board 20 is provided in the communication adapter 7. The control circuit 21 and the power supply circuit 24 to configure the communication adapter 7 are arranged on the circuit board 20.

(3) Effects of First Embodiment

According to the first embodiment as described above, effects below can be obtained. Specifically, the communication adapter 7 is attachable to and detachable from the recess 41 of the electric working machine 2. When the communication adapter 7 is attached to the recess 41 of the electric working machine 2, five outer surfaces other than the upper surface 7a, among the plurality of outer surfaces of the communication adapter 7, face the respective corresponding five surfaces of the recess 41.

Also, in the communication adapter 7, the adapter-side IF 22 is provided at the lower surface 7b facing the bottom surface of the recess 41, whereas the antenna 23 is provided at the upper surface 7a, which is an outer surface different from the outer surface where the adapter-side IF 22 is provided. Further, the upper surface 7a does not face any surface of the recess 41.

Accordingly, it is possible to achieve stable attachment of the communication adapter 7 to the electric working machine 2, and also achieve good attachability and detachability of the communication adapter 7 to and from the electric working machine 2, as well as good wireless communication performance by the communication adapter 7.

The communication adapter 7 is attached to the recess 41 in a state of being covered with the cover 45. Accordingly, the communication adapter 7 is inhibited from being detached from the recess 41. Also, when attached to the recess 41, the communication adapter 7 is supported in a state where elastic forces are applied from both of the upper surface 7a and the lower surface 7b. Specifically, the elastic forces from the two elastic supporting portions 42 are applied to the lower surface 7b, whereas the elastic forces from the two elastic pressing portions 47 are applied to the upper surface 7a. Accordingly, if a backlash occurs between the communication adapter 7 and the recess 41 of the electric working machine 2, at least part of the backlash can be absorbed, thereby enabling more stable attachment of the communication adapter 7 to the electric working machine 2.

Also, providing the elastic supporting portions 42 on the bottom surface of the recess 41 leads to a state where, when the cover 45 is removed to detach the communication adapter 7 from the recess 41, the communication adapter 7 is pushed upward from the bottom surface of the recess 41 by the biasing forces of the elastic supporting portions 42. Thus, the communication adapter 7 can be detached from the recess 41 more easily.

Further, electrical coupling between the machine-side IF 15 and the adapter-side IF 22 is established by the contactless power supply system, and transmission of electric power and information from the machine body 5 to the communication adapter 7 is performed by the contactless power supply system. Use of the contactless power supply system enables to inhibit occurrence of physical breakage of the IFs 15 and 22, to thereby achieve an improved reliability of electrical coupling through the IFs 15 and 22.

The adapter-side IF 22 corresponds to one example of an interface device and an adapter-side interface device. The dust collector 3 corresponds to one example of a communication device. The in-operation information to be transmitted from the machine body 5 to the communication adapter 7 corresponds to one example of machine information. The control circuit 21 of the communication adapter 7 corresponds to one example of an information acquisition device and a transmission device. The power supply circuit 24 of the communication adapter 7 corresponds to one example of a power obtaining device. The cover 45 corresponds to one example of a restriction member. The two elastic supporting portions 42 provided to the bottom surface of the recess 41 correspond to one example of an inner elastic member. The two elastic pressing portions 47 provided to the cover 45 correspond to one example of an outer elastic member.

Second Embodiment

A second embodiment has the same basic configuration as that of the first embodiment except for part of the configuration of the communication adapter and part of the configuration of the recess of the electric working machine; therefore, the configuration common with the first embodiment will not be described further, and differences will be described mainly. The same reference numerals as in the first embodiment represent the same configurations, and thus the preceding descriptions will be referred to.

Figure 4:
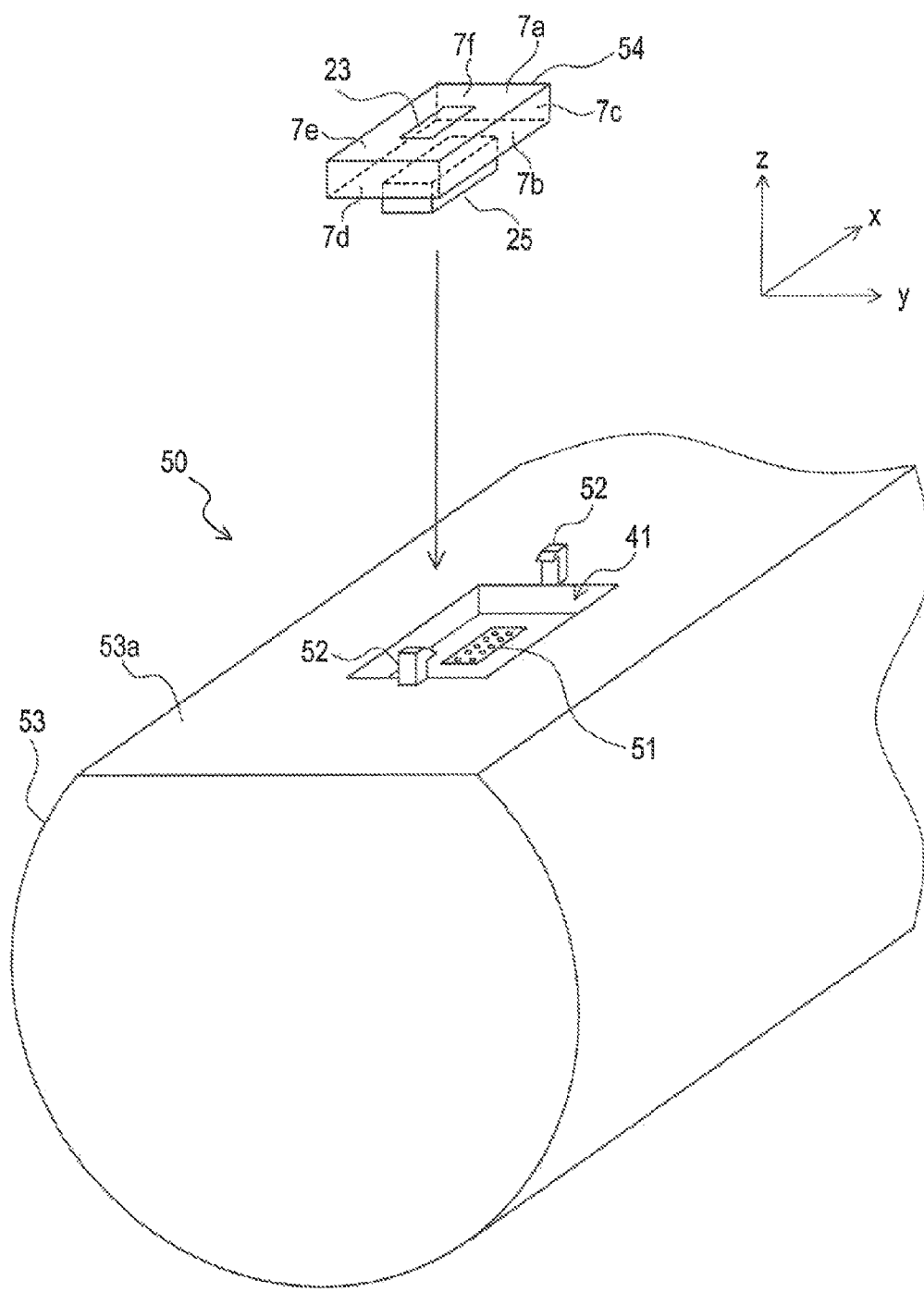
FIG. 4 is a perspective view showing a vicinity of a recess in a machine body and a communication adapter in a second embodiment.
Figure 5:
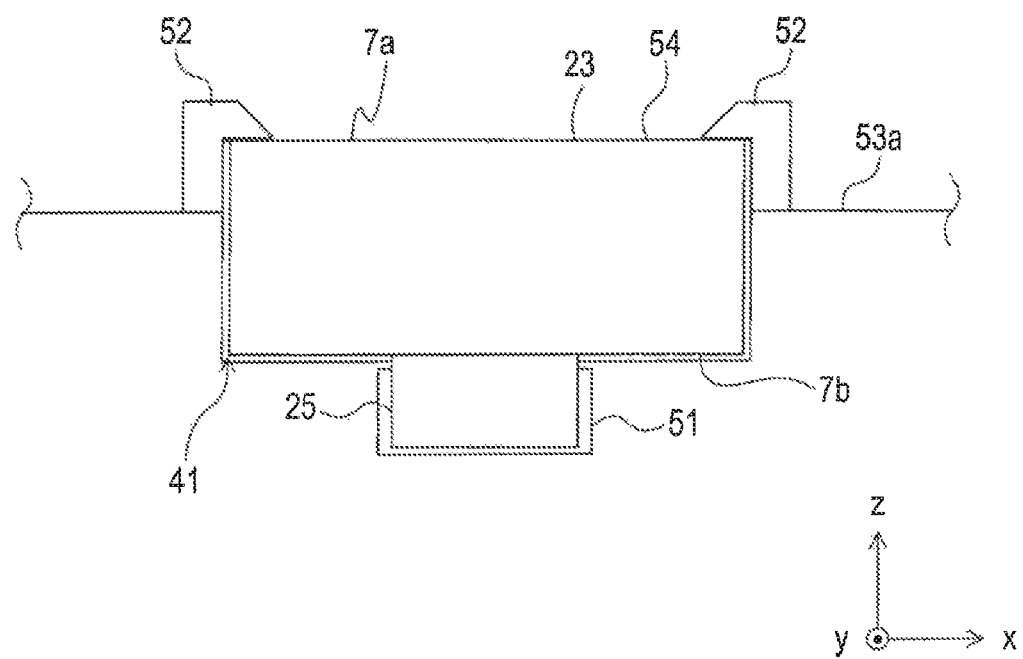
FIG. 5 is a schematic sectional view showing a state where the communication adapter is attached to the recess of the machine body in the second embodiment.

As shown in FIG. 4 and FIG. 5, a communication adapter 54 of the second embodiment is different in configuration of an adapter-side IF 25 as compared with the communication adapter 7 of the first embodiment. The adapter-side IF 25 provided to the communication adapter 54 of the second embodiment is a connector that comprises a plurality of contacts. Also, the adapter-side IF 25 is provided to protrude from the lower surface 7b.

In a machine body 50, an adapter attachment surface 53a of a housing 53 also comprises the recess 41 as in the first embodiment. A machine-side IF 51 provided at the bottom surface of the recess 41 is a connector in which the adapter-side IF 25 is to be fitted.

When the communication adapter 54 is inserted into and attached to the recess 41 these connectors, i.e., the adapter-side IF 25 and the machine-side IF 51, fit in together as shown in FIG. 5. That is, in the second embodiment, the IFs 25 and 51 are physically coupled, and transmission and reception of electric power and information is performed.

Also, in the second embodiment, hooks 52 are provided on the adapter attachment surface 53a of the housing 53 at both ends of the recess 41 in the x-axis direction. The hooks 52 press the communication adapter 54 inserted into the recess 41 on the upper surface 7a toward the bottom surface of the recess 41.

The hooks 52 are made of an elastically deformable material (for example, resin). Accordingly, the communication adapter 54 can be inserted into the recess 41 by slightly bending the hooks 52 in the x-axis direction temporarily. When the communication adapter 54 is inserted into the recess 41, the upper surface 7a of the communication adapter 54 becomes pressed by the hooks 52 as shown in FIG. 5.

Thus, the hooks 52 have both a function as an elastic member to bias the communication adapter 54 by an elastic force and a function as a restriction member to restrict detachment of the communication adapter 54 from the recess 41. The hooks 52 may be configured so as not to abut the upper surface 7a of the communication adapter 54 when the communication adapter 54 is attached to the recess 41. In this case, the hooks 52 have at least a function as a restriction member.

The four side surfaces 7c, 7d, 7e, and 7f of the communication adapter 54 may abut, or be separate from, the respective corresponding facing wall surfaces of the recess 41. Also, an elastic member may be provided between at least one of the four side surfaces 7c, 7d, 7e, and 7f and its corresponding wall surface of the recess 41. Further, in a state where connectors of the IFs 25 and 51 are fitted together, the lower surface 7b of the communication adapter 54 and the bottom surface of the recess 41 may abut, or be separate from, each other.

According to the second embodiment as described above, when the communication adapter 54 is attached to the recess 41, the communication adapter 54 is restricted from being detached from the recess 41 by the two hooks 52. Also, the communication adapter 54 is biased toward the bottom surface of the recess 41 by the two hooks 52. Accordingly, it is possible to achieve stable attachment of the communication adapter 54 to the electric working machine, and also achieve good attachability and detachability of the communication adapter 54 to and from the electric working machine, as well as good wireless communication performance by the communication adapter 54.

Third Embodiment

A third embodiment has the same basic configuration as that of the first embodiment except for part of the configuration of the recess in the electric working machine; therefore, the configuration common with the first embodiment will not be described further, and differences will be described mainly. The same reference numerals as in the first embodiment represent the same configurations, and thus the preceding descriptions will be referred to.

Figure 6A:
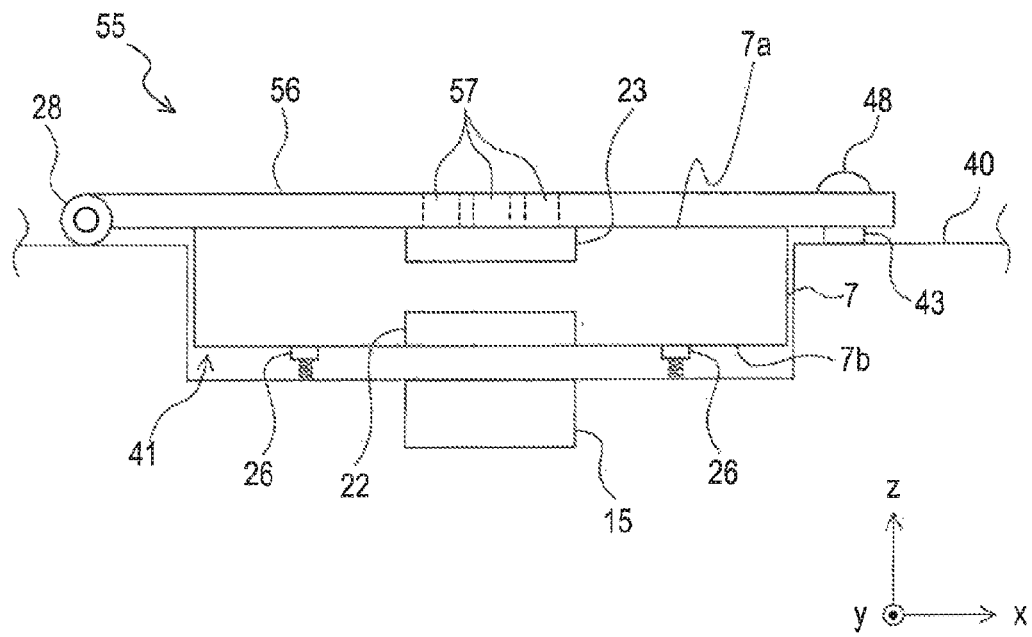
FIG. 6A is a schematic sectional view showing a state where a communication adapter is attached to a recess of a machine body in a third embodiment.

As shown in FIG. 6A, a communication adapter of the third embodiment is similar to the communication adapter 7 of the first embodiment. Also, elastic supporting portions 26 are provided on the bottom surface of the recess 41 of the housing 40 at both ends, in the x-axis direction, of an area where the machine-side IF 15 is provided. For each of the elastic supporting portions 26, a spring is used as a member to generate an elastic force in the present embodiment. When the communication adapter 7 is attached to the recess 41, the communication adapter 7 is elastically supported by the elastic supporting portions 26.

In the third embodiment, a cover 56 is provided as a restriction member to restrict detachment of the communication adapter 7 from the recess 41. The cover 56, however, is different from the cover 45 of the first embodiment in the material, the shape, and the fixing method to the housing 40.

The cover 56 of the third embodiment is of metal. Also, as shown in FIG. 6A, the cover 56 of the third embodiment comprises a hinge 28 at one end in the x-axis direction of the cover 56, and the hinge 28 is secured to the housing 40. Accordingly, the cover 56 is pivotable about the hinge 28 as a pivot center.

Figure 6B:
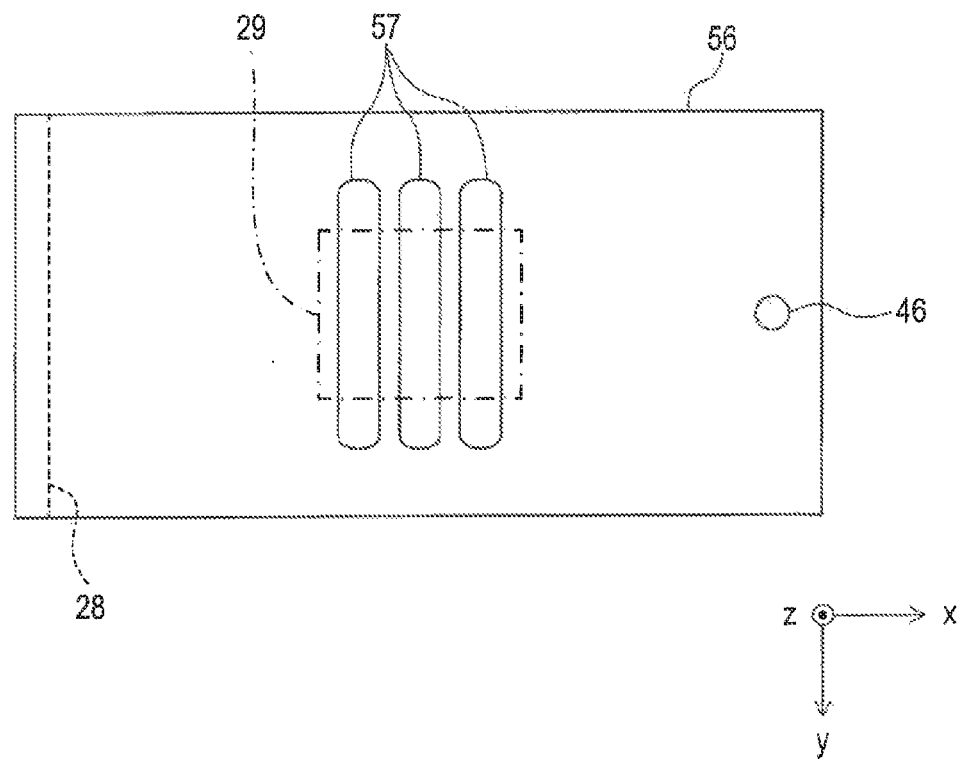
FIG. 6B is a plan view of a cover of the third embodiment.

As shown in FIG. 6B, the cover 56 as a whole has a rectangular plate-shaped configuration, which is similar to that of the cover 45 of the first embodiment, but is provided with the hinge 28 at the one end as described above. The cover 56 comprises at the other end thereof a screw hole 46. Also, the cover 56 comprises at a generally central portion thereof three slits 57.

When inserting the communication adapter 7 into the recess 41, the cover 56 is first opened to expose the bottom surface of the recess 41, and then the communication adapter 7 is inserted into the recess 41. After the communication adapter 7 is inserted, the cover 56 is closed and screw-fastened by the screw 48 to prevent opening of the cover 56. FIG. 6A shows a state where attachment of the communication adapter 7 has been completed as described above.

Once the communication adapter 7 is attached to the recess 41, the lower surface 7b of the communication adapter 7 is elastically supported by the elastic supporting portions 26. In addition, the upper surface 7a of the communication adapter 7 abuts the cover 56 due to a biasing force of the elastic supporting portions 26, and thereby the communication adapter 7 receives a reaction force from the cover 56. Accordingly, the communication adapter 7 attached to the recess 41 is supported stably by the respective forces applied on the upper surface 7a and the lower surface 7b.

Once the communication adapter 7 is attached to the recess 41, the antenna 23 of the communication adapter 7 faces an antenna facing area 29 in the cover 56 as shown in FIG. 6B. The antenna facing area 29 comprises slits 57. The slits 57 correspond to one example of a through hole.

In general, metal has a property to strongly shield radio waves. If the cover 45 of the first embodiment is made of metal, the cover 45 will obstruct transmission and reception of radio waves by the antenna 23, thereby disabling good transmission and reception. In contrast, although the cover 56 of the third embodiment is made of metal, the antenna facing area 29 that the antenna 23 faces comprises the slits 57, and thus transmission and reception of radio waves by the antenna 23 is performed successfully through the slits 57.

Fourth Embodiment

A fourth embodiment is different from the first embodiment in the installation position of the adapter-side IF in the communication adapter, and the shape of the housing and the configuration of a vicinity of an attachment portion for the communication adapter in the electric working machine. Since the remaining configurations are basically the same as those in the first embodiment, the common configurations will be assigned the same reference numerals as in the first embodiment and will not be described further, and differences from the first embodiment will be described mainly.

Figure 7:
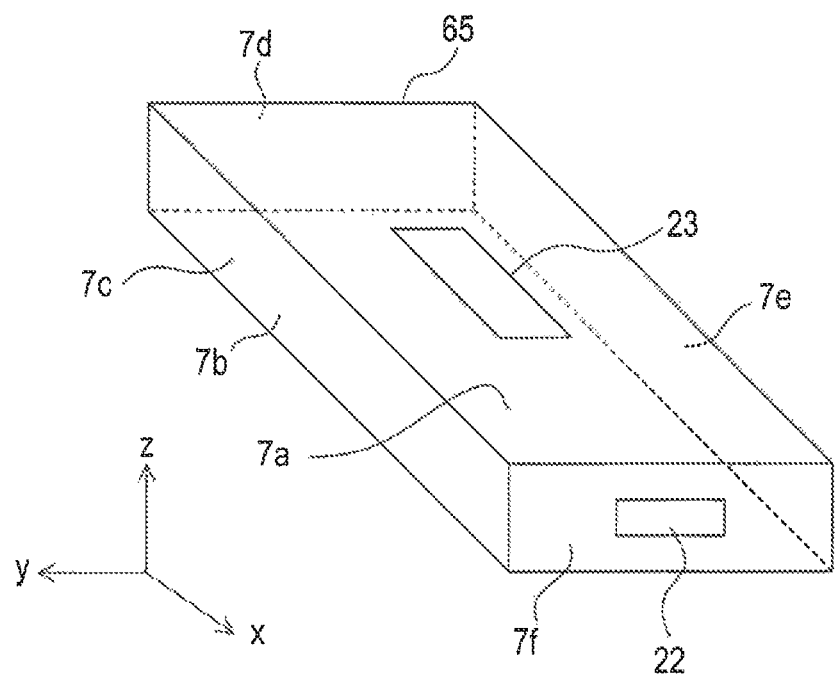
FIG. 7 is a perspective view of a communication adapter of a fourth embodiment.

As shown in FIG. 7, in a communication adapter 65 of the fourth embodiment, the adapter-side IF 22 is provided not at the lower surface 7*b* but at the side surface 7*f* of the communication adapter 65. Also, as shown in FIG. 8A, an end of a housing 61 of a machine body 60 comprises a recess 62 for attachment thereto of the communication adapter 65. The recess 62 comprises a placement surface 62*a* and a wall surface 62*b*. The machine-side IF 15 is provided at the wall surface 62*b*. The communication adapter 65 is attached to the recess 62 in such a manner that the communication adapter 65 is placed in an adapter arrangement area 64 in the placement surface 62*a*.

Three hooks 52 are provided around the adapter arrangement area 64 in the placement surface 62*a* of the recess 62. Two of the hooks 52 are arranged to face each other in the y-axis direction, whereas the remaining one of the hooks 52 is arranged to face the wall surface 62*b* of the recess 62 in the x-axis direction.

The communication adapter 65 is attached to the recess 62 such that the side surface 7*f* of the communication adapter 65, at which the adapter-side IF 22 is provided, faces the wall surface 62*b* of the recess 62. A simple action to place the communication adapter 65 on the placement surface 62*a* of the recess 62 will result in an abutment of the lower surface 7*b* of the communication adapter 65 on the hooks 52. However, since the hooks 52 are made of an elastically deformable material as described in the first embodiment, the communication adapter 65 can be attached to the recess 62 by appropriately bending the hooks 52 outwardly when inserting the communication adapter 65.

FIG. 8B shows a state where attachment of the communication adapter 65 to the recess 62 has been completed. Once the communication adapter 65 is attached to the recess 62, the upper surface 7*a* of the communication adapter 65 are pressed by the hooks 52. Also, the side surface 7*f* of the communication adapter 65, at which the adapter-side IF 22 is provided, abuts the wall surface 62*b* of the recess 62, resulting in a positional relationship where the adapter-side IF 22 and the machine-side IF 15 face each other.

Among the four side surfaces of the communication adapter 65, the three side surfaces 7*c*, 7*d*, and 7*e* other than the side surface 7*f,* which faces the wall surface 62*b*, abut the hooks 52. Accordingly, movement of the communication adapter 65 on the x-y plane is restricted by the wall surface 62*b* of the recess 62 and the three hooks 52.

In the third embodiment as well, the three hooks 52 have both a function as an elastic member to bias the communication adapter 65 by an elastic force and a function as a restriction member to restrict detachment of the communication adapter 65 from the recess 62.

According to the fourth embodiment as described above, the recess 62 and the communication adapter 65 face each other at respective two surfaces, and the communication adapter 65 is stably arranged on the recess 62 at least at the two facing surfaces. Further, by using the three hooks 52, stable attachment of the communication adapter 65 is achieved.

First Reference Example

Next, a technique related to the above-described embodiments will be described as a first reference example. In a case where a communication adapter acquires operational information regarding whether an electric working machine is in operation and transmits the operational information to an external device, such as a dust collector, it is advantageous if the communication adapter can acquire the operational information even when the electric working machine itself does not have a function to transmit the operational information to the communication adapter.

In this connection, Japanese Patent No. 4550357 describes a technique of detecting an electric current, which flows in a motor inside a tool during an operation of the tool, externally from the tool using a current transformer, and detecting an operating state of the motor based on the detected value.

However, in the case of detecting the electric current flowing in the motor externally from the tool using the current transformer, it is necessary to apply a change in magnetic flux generated by the motor current to the current transformer; thus, there is a possibility that a change in magnetic flux that can be detected by the current transformer occurs due to a factor other than the electric current flowing in the motor, depending on the surrounding environment. Accordingly, simply using a detected value by the current transformer might lead to an inaccurate detection of the operating state of the motor.

There are physical quantities, other than the electric current in the motor, which change depending on an ON (operation) or OFF (stop) of the motor. For example, since sound generated from a tool during motor operation is larger than during motor stop, there may be a method for detecting the operating state of the motor based on a sound pressure level generated from the motor. However, when noise occurs around the tool, the noise may lead to an erroneous detection that the motor is in operation.

As described above, the technique of detecting the operating state of the motor based on a physical quantity that changes depending on ON/OFF of the motor involves a problem that the detection may be influenced by, for example, various environmental changes and conditional changes that occur naturally regardless of ON/OFF of the motor.

Now, a description will be given of a communication adapter, as a first reference example, which is capable of accurately detecting the operating state of a motor based on a physical quantity that changes depending on ON/OFF of the motor without being influenced by surrounding environmental changes, conditional changes, and so on.

A detection principle of the operating state of a motor in the present reference example is as described below. First, a physical quantity of the same kind is detected at each of two different positions. Specifically, the physical quantity is detected at a portion (hereinafter, a main detection portion) where the physical quantity to be detected changes depending on ON/OFF of the motor, whereas the physical quantity is detected at another portion (hereinafter, a sub detection portion) where the influence by ON/OFF of the motor is smaller than that at the main detection portion or no influence is given.

Then, the operating state of the motor is detected based on a difference between the physical quantity detected at the main detection portion and the physical quantity detected at the sub detection portion. If some influence is given to the physical quantity detected at the main detection portion due to an surrounding environmental change or the like, the same influence will be given to the physical quantity detected at the sub detection portion. Accordingly, by using a difference between the two detected physical quantities, the influence caused by, for example, the surrounding environmental change will be removed, and an accurate detection can be achieved.

Figure 9:
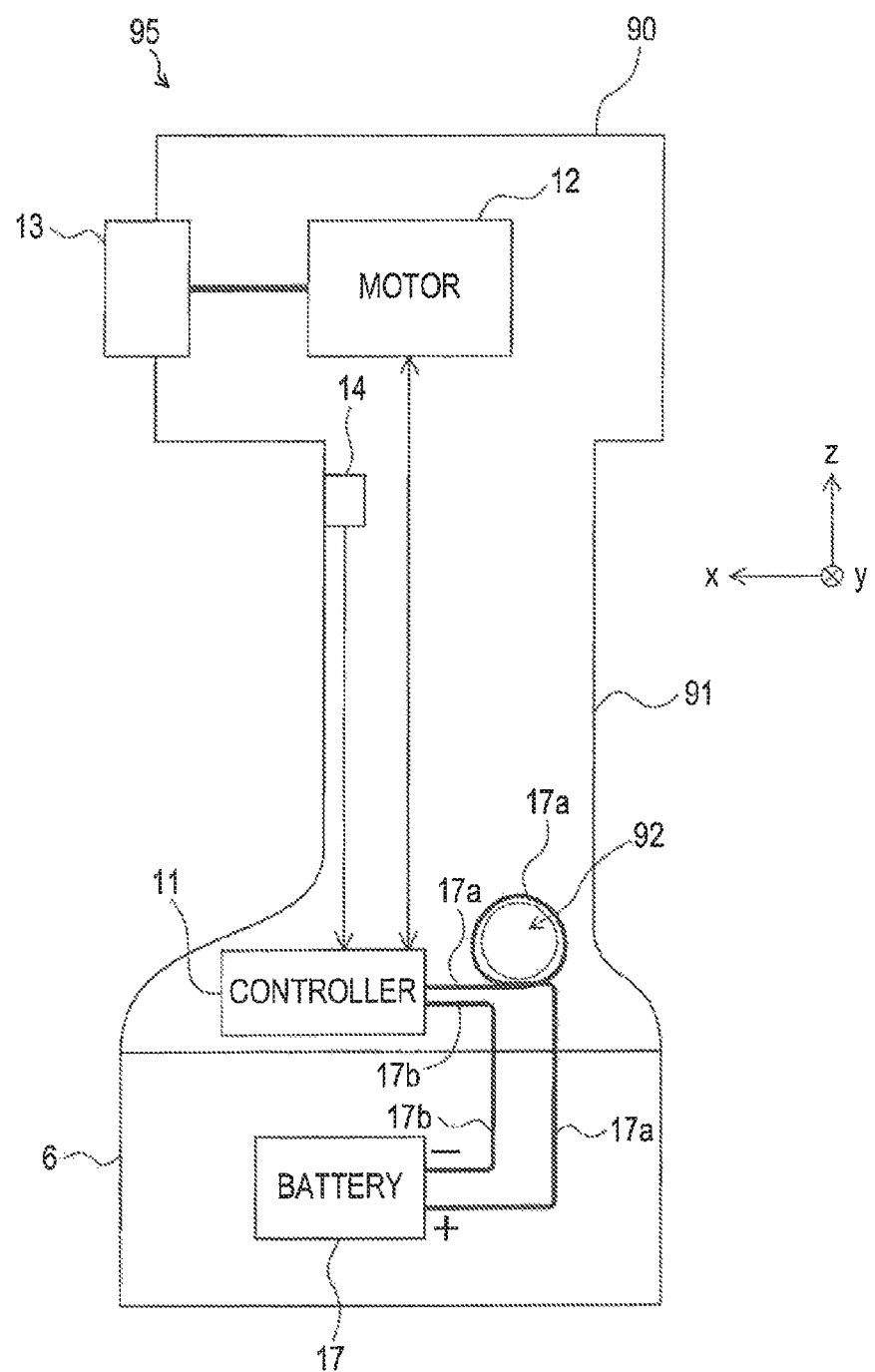
FIG. 9 is a side elevational view showing an internal configuration of an electric working machine of a first reference example.

More specifically, in the first reference example, a magnetic flux outside of the electric working machine is detected by two Hall sensors, and the operating state of the motor is detected based on a difference between the two values detected by the two Hall sensors. As shown in FIG. 9, an electric working machine 95 of the first reference example comprises a machine body 90 and a battery pack 6. The electric working machine 95 is obtained by omitting the machine-side IF 15 in the electric working machine 2 of the first embodiment.

A housing 91 of the machine body 90 comprises an insertion hole 92 to insert therethrough a communication adapter 80. The insertion hole 92 penetrates the housing 91 in the y-axis direction. A portion to insert therethrough the communication adapter 80 need not penetrate the housing 91 as the aforementioned insertion hole 92. For example, the housing 91 may comprise one side surface with a hole and the other side surface without a hole. In other words, it may be configured such that the housing 91 comprises in one side surface thereof a recess, in which the communication adapter 80 is inserted and secured. Further, an insertion direction of the communication adapter 80 into the housing 91 is not limited to the y-axis direction.

Also in the electric working machine 95, wiring is provided to supply a battery power from the battery 17 of the battery pack 6 to the controller 11 in the machine body 90. Specifically, a positive electrode lead 17a coupled to a positive electrode of the battery 17 and a negative electrode lead 17b coupled to a negative electrode of the battery 17 are provided. The positive electrode lead 17a is wired to be wound around the through hole 92 at least once such that a magnetic flux generated from the positive electrode lead 17a can be detected in the through hole 92.

The negative electrode lead 17b may be wound around the through hole 92 instead of the positive electrode lead 17a. Alternatively, the positive electrode lead 17a and the negative electrode lead 17b may be wound around the through hole 92 in mutually opposite winding directions.

Figure 10:
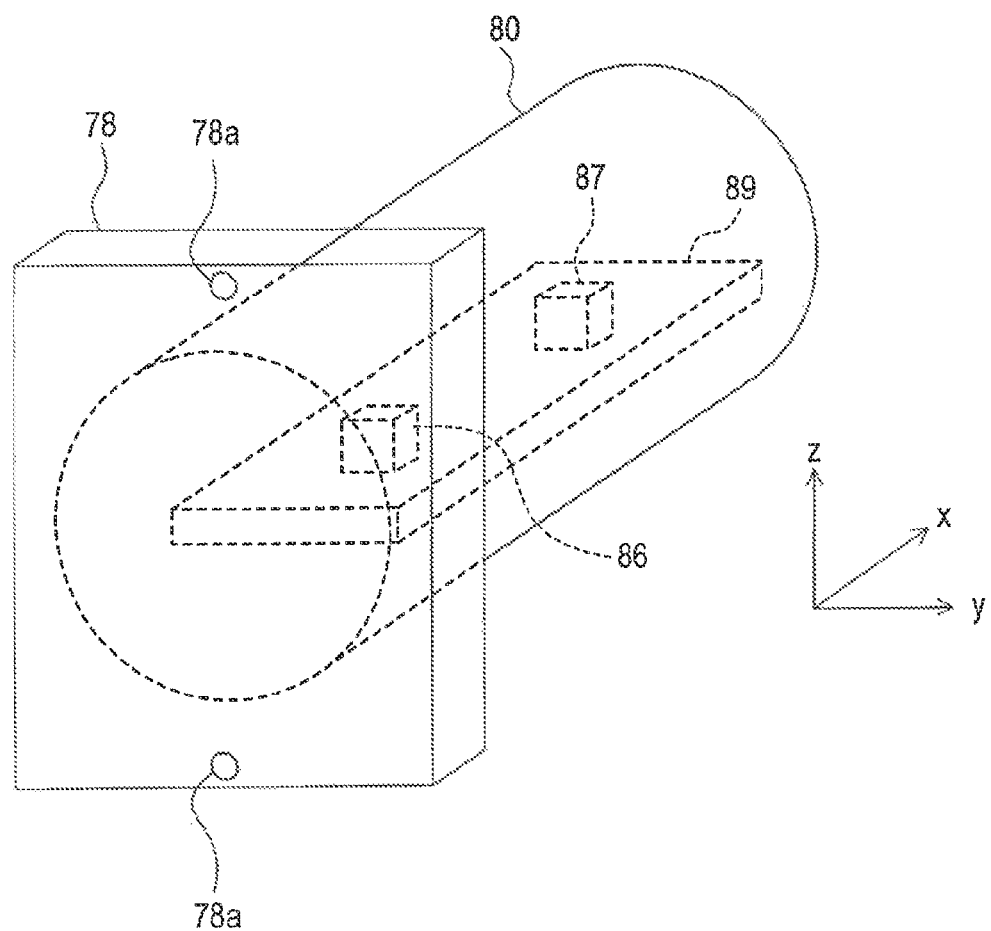
FIG. 10 is a perspective view of a communication adapter of the first reference example.

The communication adapter 80 to be inserted into the through hole 92 has a cylindrical outer shape as shown in FIG. 10. The communication adapter 80 comprises therein a circuit board 89 with various circuits, and the first Hall sensor 86 and the second Hall sensor 87 are mounted on the circuit board 89. The circuit board 89 comprises a control circuit that executes various processes. A power supply for operation of the communication adapter 80 may be obtained from the electric working machine 95 in the same manner as in the first embodiment, or may be obtained from a battery installed in the communication adapter 80 itself. A fixing plate 78 is provided at an end of the communication adapter 80. The fixing plate 78 comprises two screw holes 78a. The fixing plate 78 is used to secure the communication adapter 80 to the electric working machine 95.

Figure 11:
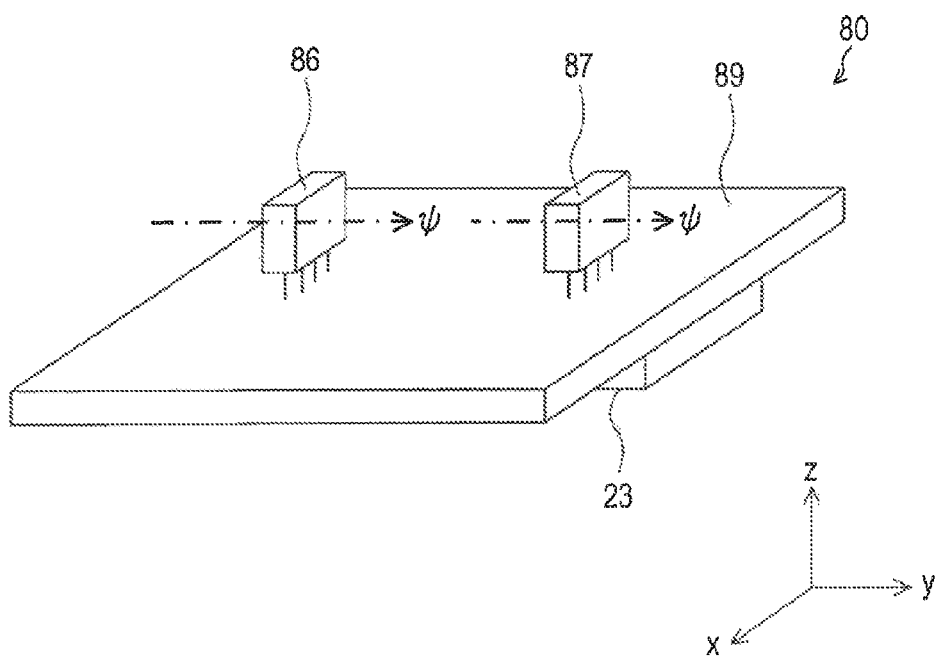
FIG. 11 is a perspective view showing an internal configuration of the communication adapter of the first reference example.

As shown in FIG. 11, the antenna 23 is mounted on a surface of the circuit board 89 reverse to a surface on which the Hall sensors 86 and 87 are mounted. As shown in FIG. 11, the Hall sensors 86 and 87 are arranged such that a detection direction of a magnetic flux ψ of the Hall sensor 86 and a detection direction of a magnetic flux ψ of the Hall sensor 87 are the same direction (the y-axis direction in FIG. 11) along the y-axis direction on the same surface of the circuit board 89.

Figure 12:
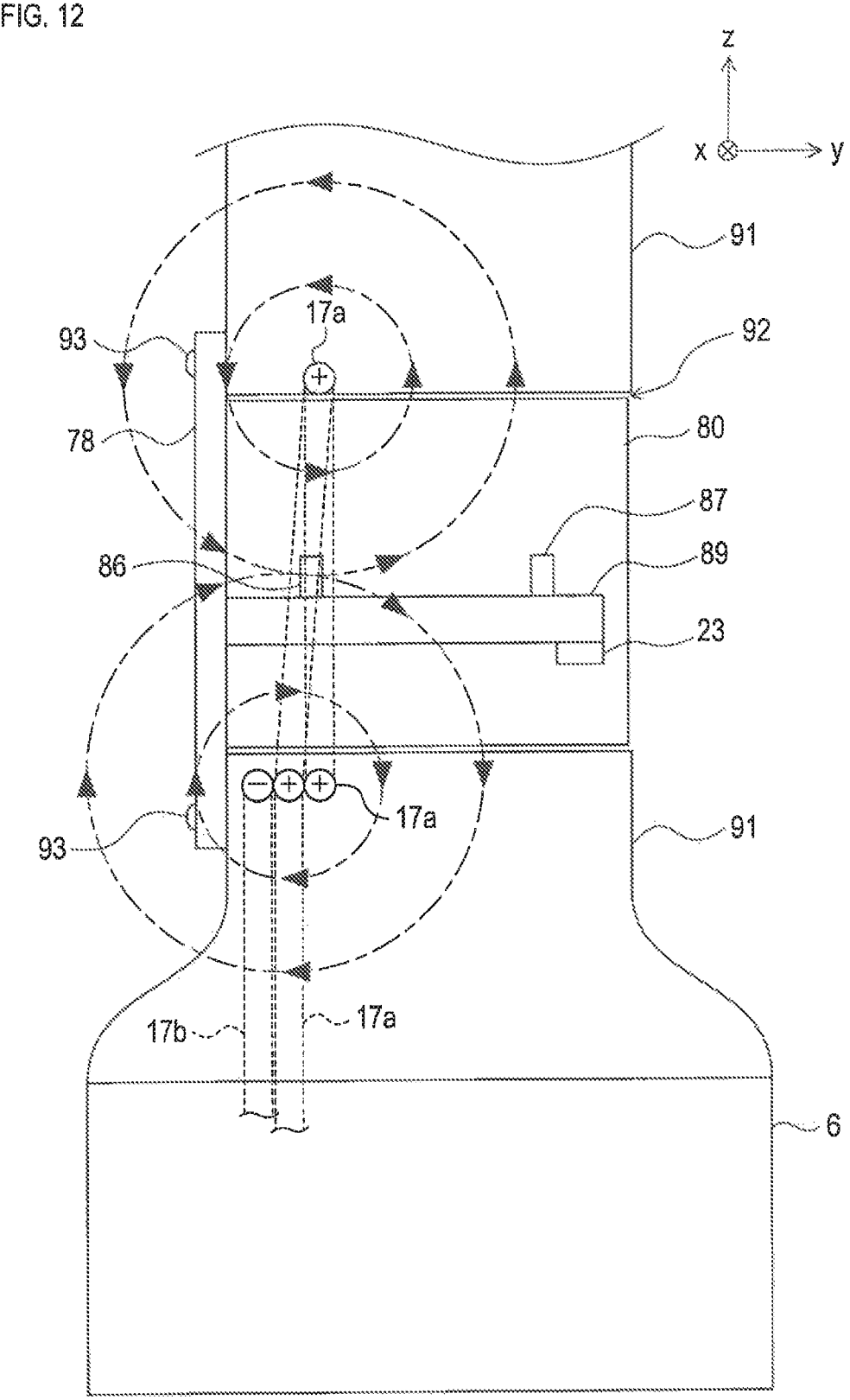
FIG. 12 is a schematic sectional view showing the communication adapter and a vicinity thereof in the electric working machine of the first reference example, to which the communication adapter is attached.

FIG. 12 shows a state where the communication adapter 80 configured as described above is inserted into the through hole 92 in the housing 91 of the electric working machine 95. The communication adapter 80 is secured to the housing 91 by screws 93 using the two screw holes 78a provided in the fixing plate 78.

As shown in FIG. 12, the positive electrode lead 17a is wound at a position shifted from a center position in the y-axis direction of the through hole 92 toward a side surface, that is, at a position closer to the fixing plate 78. As a result, a relatively large amount of the magnetic flux, which is generated from the positive electrode lead 17a, penetrates the first Hall sensor 86 of the two Hall sensors 86 and 87. In contrast, the second Hall sensor 87 is located separate from the winding position of the positive electrode lead 17a in the y-axis direction. As a result, an amount of the magnetic flux, which is generated from the positive electrode lead 17a, penetrating the first Hall sensor 86 is larger than the amount of the magnetic flux penetrating the second Hall sensor 87.

It may not be impossible to detect the operating state of the motor using only the first Hall sensor 86. However, an absolute quantity of the magnetic flux penetrating the first Hall sensor 86 is very small, although larger than that in the case of the second Hall sensor 87. For example, when an electric current of the motor 12 in an unloaded condition is 3 A, the magnetic flux at a position separated from the positive electrode lead 17a, for example, by 1 cm is about 60 µT, which is very small and is different only a little from the geomagnetism (for example, about 50 µT). Accordingly, the influence of the geomagnetism cannot be ignored, and a detected magnetic flux may vary substantially depending on a posture of the electric working machine 95.

In light of the above, in the first reference example, the first Hall sensor 86 is arranged at a position close to the positive electrode lead 17a, whereas the second Hall sensor 87 is arranged at a position distant from the positive electrode lead 17a mainly for measuring the geomagnetism. The control circuit in the circuit board 89 determines whether an electric current is flowing in the motor 12, that is, whether the electric working machine 95 is in operation based on a difference between respective detected values by the Hall sensors 86 and 87. For example, if the difference is equal to or more than a specified threshold value, it is determined that the electric working machine 95 is in operation. Then, a signal indicating the determination of in-operation is wirelessly transmitted from the antenna 23.

By detecting the ON/OFF of the motor 12 based on the difference in value between the two Hall sensor 86 and 87, it is possible to reduce the influence of the surrounding environment (here, mainly the influence of the geomagnetism), and to make a more accurate detection than in a case of using a single Hall sensor.

It is difficult to downsize an adapter using a current transformer as described in aforementioned Japanese Patent No. 4550357 since a current transformer is generally large in size. In contrast, in the first reference example, an electric current flowing in the motor 12 is detected using the Hall sensors 86 and 87. Since a Hall sensor is generally small in size as compared with a current transformer, use of the Hall sensors 86 and 87 enables downsizing of the communication adapter 80.

Second Reference Example

In the first reference example, the ON/OFF of the motor is detected based on the electric current flowing through the leads in the machine. However, there are other physical quantities that change depending on ON/OFF of the motor. Specific examples include temperature and atmospheric pressure in a vicinity of a ventilation window to take in cooling air for the motor or a ventilation window to discharge cooling air provided to the electric working machine.

(1) Detection of ON/OFF of Motor Based on Atmospheric Pressure

Figure 13:
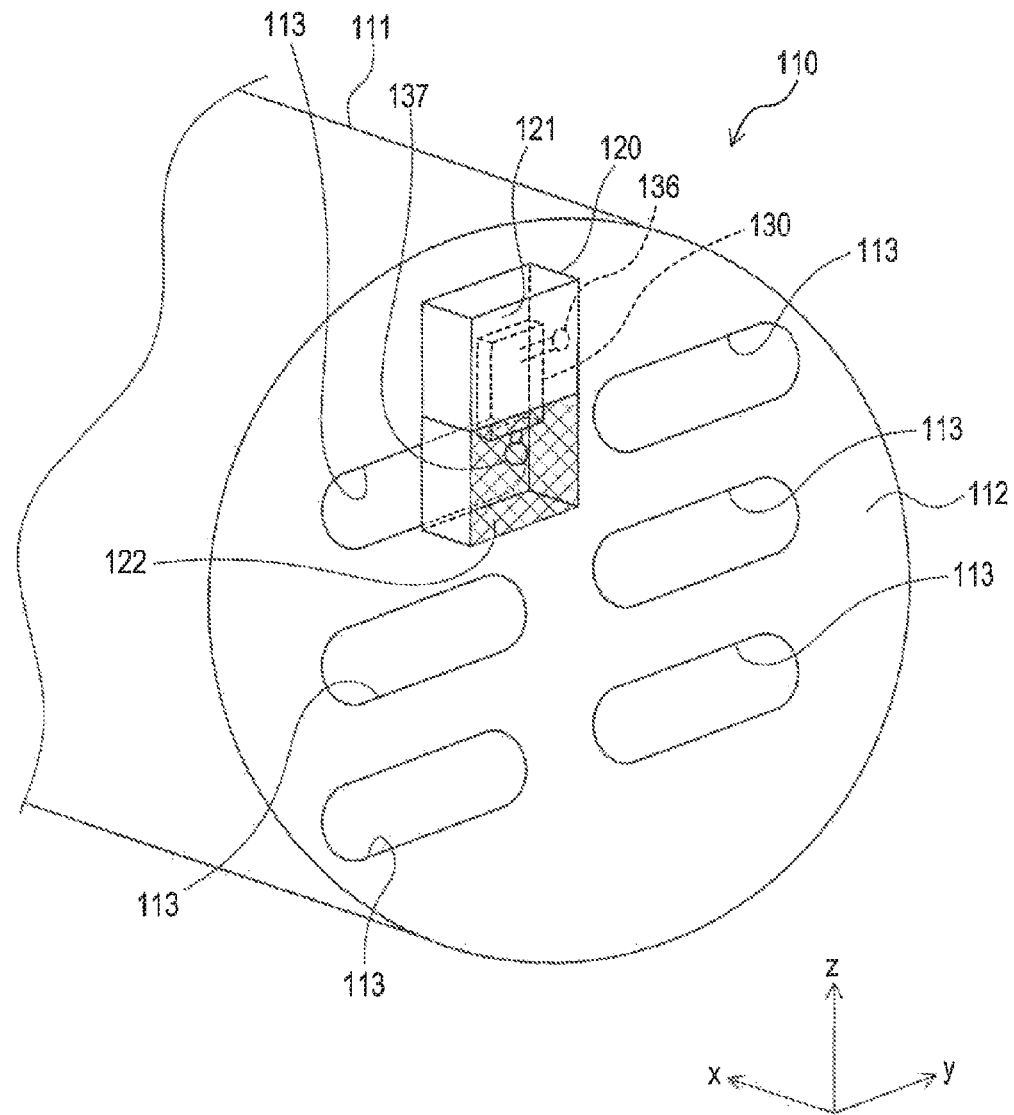
FIG. 13 is a perspective view showing a state where a communication adapter is attached to a machine body in a second reference example.

First, a description will be given of an example in which the ON/OFF of the motor is detected based on the atmospheric pressure. FIG. 13 shows an end of a housing 111 of a machine body 110 in an electric working machine. An end surface 112 of the housing 111 comprises a plurality of ventilation windows 113 to take air into the housing 111. In the housing 111, the fan 16 and the motor 12 are arranged in this order from the end surface 112. The ventilation windows 113 may be discharge ports to discharge cooling air after cooling the motor 12 from the housing 111. In this case, the motor 12 and the fan 16 are arranged in this order from the end surface 112 in the housing 111.

A communication adapter 120 is mounted to the end surface 112. The communication adapter 120 comprises a shielding case portion 121 and a ventilating case portion 122. Since all outer surfaces of the shielding case portion 121 are flat plates, there is no ventilation through the outer surfaces. On the other hand, the ventilating case portion 122 comprises a net-like surface that is parallel to the end surface 112, and ventilation can be obtained through the net-like surface. In the second reference example as well, it may be configured, for example, such that the end surface 112 comprises a recess for attachment thereto of the communication adapter 120, and the communication adapter 120 is attachable to the recess in a similar manner as in the aforementioned embodiments.

Inside the communication adapter 120, that is, inside the shielding case portion 121 and the ventilating case portion 122, a circuit board 130 is provided, and a first atmospheric pressure sensor 136 and a second atmospheric pressure sensor 137 are coupled to the circuit board 130. The circuit board 130 comprises a control circuit that executes various processes. A power supply for operation of the communication adapter 120 may be obtained from the machine body 110, or may be obtained from a battery installed in the communication adapter 120 itself.

The first atmospheric pressure sensor 136 is arranged in the shielding case portion 121, whereas the second atmospheric pressure sensor 137 is arranged in the ventilating case portion 122. Accordingly, when the motor 12 operates and the fan 16 rotates in the housing 111, thereby causing cooling air to flow into the housing 111 through the ventilation window 113, the cooling air directly blows on the second atmospheric pressure sensor 137, whereas the cooling air hardly blows on the first atmospheric pressure sensor 136.

As a result, there is a difference between respective detected values of the atmospheric pressure by the first atmospheric pressure sensor 136 and the second atmospheric pressure sensor 137. Then, the control circuit arranged on the circuit board 130 determines whether the motor 12 is in operation based on the difference between the respective detected values by the first atmospheric pressure sensor 136 and the second atmospheric pressure sensor 137. For example, it is determined that the motor 12 is in operation if the difference is equal to or more than a specified threshold value. Then, a signal indicating the determination of in-operation is wirelessly transmitted from an antenna.

By detecting the ON/OFF of the motor 12 based on the difference in detected value between the first and second atmospheric pressure sensors 136 and 137, it is possible to reduce the influence of the surrounding environment (here, mainly the influence of the atmospheric pressure), and to make a more accurate detection than in a case of using a single atmospheric pressure sensor.

(2) Detection of ON/OFF of Motor Based on Temperature

Next, a description will be given of an example in which the ON/OFF of the motor is detected based on the temperature with reference to FIG. 13. Specifically, the description will be given on the premise that the two sensors 136 and 137 provided to the communication adapter 120 shown in FIG. 13 are temperature sensors. Although it is described in the aforementioned example based on the atmospheric pressure that cooling air flows into the housing 111 through the ventilation windows 113, it will be described here that exhaust air after the motor 12 is cooled by cooling air is discharged through the ventilation windows 113. Specifically, in the present example, the motor 12 and the fan 16 are arranged in the housing 111 in this order from the end surface 112.

Inside the communication adapter 120, that is, inside the shielding case portion 121 and the ventilating case portion 122, a circuit board 130 is provided, and a first temperature sensor 136 and a second temperature sensor 137 are coupled to the circuit board 130. It may be appropriately determined specifically what type of thermosensor is to be used for each of the first and second temperature sensors 136 and 137. For example, a thermistor, a thermocouple, or any other thermosensor may be used.

The first temperature sensor 136 is arranged in the shielding case portion 121 for measuring an ambient temperature, whereas the second temperature sensor 137 is arranged in the ventilating case portion 122 for measuring an exhaust air temperature. Accordingly, when the motor 12 operates and the fan 16 rotates in the housing 111, thereby causing exhaust air of cooling air to be discharged through the ventilation window 113, a temperature detected by the second temperature sensor 137 will be relatively high, whereas a temperature detected by the first temperature sensor 136 will be lower than the detected temperature by the second temperature sensor 137. As a result, there will be a difference between respective detected values of the temperature by the first temperature sensor 136 and the second temperature sensor 137.

Then, the control circuit arranged on the circuit board 130 determines whether the motor 12 is in operation based on the difference between the respective detected values by the first temperature sensor 136 and the second temperature sensor 137. For example, it is determined that the motor 12 is in operation if the difference is equal to or more than a specified threshold value. Then, a signal indicating the determination of in-operation is wirelessly transmitted from an antenna.

In a case of determining the ON/OFF of the motor 12 using a single temperature sensor, a detected value by the single temperature sensor will vary due to influence of an ambient temperature, and will also vary depending on a cooling state of the motor 12. Thus, it will be difficult to determine the ON/OFF of the motor 12 by using, for example, a certain fixed threshold value with respect to the detected value by the single temperature sensor.

In contrast, in the present reference example, the ON/OFF of the motor 12 is detected based on a detection difference of the two temperature sensors 136 and 137. Thus, it is possible to reduce the influence of the surrounding environment (here, mainly the influence of the temperature), and to make a more accurate detection than in the case of using a single temperature sensor.

There is a problem in determining the ON/OFF of the motor 12 based on the exhaust air temperature as described above. The problem is that when a workload is small, a heat generation amount of the motor 12 is small, resulting in a small increase in the exhaust air temperature. Such a small increase in the exhaust air temperature leads to a small difference between the respective detected values by the temperature sensors 136 and 137; thus, it may be impossible to accurately determine the ON/OFF of the motor 12.

Accordingly, on an assumption that the heat generation amount of the motor 12 may be small, it may be possible to detect the ON/OFF of the motor 12 on a side of taking in cooling air by a method as described below. Specifically, a temperature sensor capable of self-heating by electric conduction is used as one temperature sensor of the two temperature sensors. The one temperature sensor is caused to be self-heated by electric conduction. One example of a temperature sensor capable of self-heating is a thermistor, and a thermistor may be used at least for the one temperature sensor to be self-heated out of the two temperature sensors. It is a matter of course that the two temperature sensors may be the same temperature sensors (for example, thermistors), one of which may be self-heated.

Electric conduction to the temperature sensor to be self-heated is performed such that self-heating of the temperature sensor is saturated and a heat generation amount becomes constant. In other words, electric conduction is performed to reach a state where an electric power supplied to the temperature sensor and an electric power discharged as heat from the temperature sensor are balanced.

Also, the one temperature sensor to be self-heated is arranged at a position on which cooling air directly blows, whereas the other temperature sensor for measuring the ambient temperature is arranged at a position on which cooling air is relatively less likely to blow. Then, the ON/OFF of the motor 12 is determined while self-heating of the one temperature sensor is being continued.

When the motor 12 is turned on, that is, starts operation (rotation), an energy discharged as heat from the self-heated temperature sensor by cooling air is increased, and the discharged energy becomes larger than an energy supplied to the self-heated temperature sensor. As a result, the temperature at the self-heated temperature sensor is lowered by the cooling air.

The ON/OFF of the motor 12 can be determined, for example, by monitoring a variation of the detection difference between the two temperature sensors relative to the detection difference before the motor 12 starts rotation. Suppose that an ON-detection threshold value with respect to the variation of the detection difference is 10 degrees. If the detection difference before rotation of the motor 12 is 30 degrees, and the detection difference is decreased to, for example, 15 degrees after rotation of the motor 12, the variation of the detection difference is 15 degrees, which exceeds 10 degrees as the ON-detection threshold value. In this case, a determination may be made that the motor 12 is ON.

If electric conduction to the one temperature sensor for self-heating is continued after the determination of an ON-state of the motor 12, the temperature will be increased again by self-heating when the motor 12 is turned off, that is, the rotation is stopped and thereby cooling air is stopped. Accordingly, it is also possible, after the determination of the ON-state, to determine that the motor 12 is OFF based on a temperature increase of the one temperature sensor that is self-heated.

It may be configured such that a user can optionally determine a timing to start electric conduction to the temperature sensor for self-heating and a timing to stop electric conduction. For example, it may be configured such that a power switch, which is on-off operable by a user, is provided to the communication adapter, and electric conduction to the temperature sensor for self-heating is started and thereby self-heating of the temperature sensor is started when the power switch is turned on, whereas electric conduction is stopped and thereby self-heating is stopped when the power switch is turned off. It may also be configured such that, when the power switch is turned off, not only the electric conduction to the thermistor but also an operation of the entire communication adapter is stopped. Specifically, for example, it may be configured such that conduction and disconnection of a power supply path from a power supply, such as an installed battery, to an internal circuit and the like is performed by the power switch.

[Technical Ideas to be Understood from Reference Examples]

At least technical ideas below will be understood from the first reference example and the second reference example.

[1] A communication adapter comprising:

a first detector provided at a first portion and configured to detect a specified physical quantity, the first portion being a portion at which, when the communication adapter is attached to an electric working machine, a variation occurs between the physical quantity while the electric working machine is in operation and the physical quantity while the electric working machine is not in operation, and the electric working machine being configured to drive a working element by an electric power;

a second detector provided in a second portion separate from the first detector and configured to detect the physical quantity, the second portion being a portion at which, when the communication adapter is attached to the electric working machine, no variation occurs, or a smaller variation than the variation detected by the first detector occurs, between the physical quantity while the electric working machine is in operation and the physical quantity while the electric working machine is not in operation;

a difference calculator configured to calculate a difference between a first detected value as a detected value of the physical quantity by the first detector and a second detected value as a detected value of the physical quantity by the second detector;

a determination device configured to determine whether the electric working machine is in operation based on the difference calculated by the difference calculator;

an antenna configured to be capable of transmitting a radio wave for wireless communication with another communication device other than the electric working machine; and a transmission device configured to transmit operational information to the communication device through the antenna when it is determined by the determination device that the electric working machine is in operation, the operational information indicating that the electric working machine is in operation.

According to the communication adapter configured as described above, the same physical quantity can be detected individually at the first portion where the physical quantity varies depending on whether the electric working machine is in operation and at the second portion where the physical quantity does not vary regardless of whether the electric working machine is in operation, or varies only a little. Then, an operating state of the electric working machine is detected based on a difference between individual detection results. Accordingly, an accurate detection can be achieved by reducing an influence of a variation of the physical quantity, which occurs regardless of whether the electric working machine is in operation, that is, an influence caused by a variation of a surrounding environment or the like.

[2] The communication adapter according to [1], wherein the first detector and the second detector are each configured to detect, as the physical quantity, a magnitude of a magnetic field in a same direction, and to be capable of outputting a signal indicating a detected value.

According to the communication adapter configured as described above, the electric working machine may be configured, for example, such that, when the communication adapter is attached, the first detector is positioned in a vicinity of one (hereinafter, a detection target wire) of wires arranged in the electric working machine, and the second detector is positioned more distant from the detection target wire than the first detector. In other words, it may be configured such that the first detector is positioned in a portion where the magnetic field generated by an electric current flowing through the detection target wire can be detected, and the second detector is positioned in a portion where the magnetic field generated by the electric current flowing through the detection target wire cannot be detected, or a detected value by the second detector is smaller than the detected value by the first detector.

According to such configuration, when the electric current flows through the detection target wire and the electric working machine is in an operating state, a difference between the detected value of the magnetic field by the first detector and the detected value of the magnetic field by the second detector is larger than that when the electric working machine is in a non-operating state. Thus, it is possible to accurately determine whether the electric working machine is in operation based on the difference, specifically, for example, based on whether the difference is equal to or more than a specified threshold value.

[3] The communication adapter according to [1], wherein the first detector and the second detector are each configured to detect an atmospheric pressure as the physical quantity.

According to the communication adapter configured as described above, the electric working machine may be configured, for example, such that when the communication adapter is attached, the first detector is positioned at an inlet port or a discharge port for cooling air of a motor provided in the electric working machine, whereas the second detector is positioned at a different location from the inlet port or the discharge port. Specifically, it may be configured such that the first detector is positioned at a portion on which the cooling air flowing into the electric working machine or the cooling air discharged from the electric working machine directly blows, whereas the second detector is positioned at a portion on which the cooling air does not directly blow.

According to such configuration, when the electric working machine operates and enters a state where the cooling air flows into, and is discharged from, the electric working machine, the difference between the detected value of the atmospheric pressure by the first detector (that is, the detected value of the atmospheric pressure of the cooling air) and the detected value of the atmospheric pressure by the second detector (that is, the detected value of the atmospheric pressure at the portion receiving no, or a little, influence of the cooling air) is larger than that during non-operation of the electric working machine. Thus, it is possible to accurately determine whether the electric working machine is in operation based on the difference, specifically, for example, based on whether the difference is equal to or more than a specified threshold value.

[4] The communication adapter according to [1], wherein the first detector and the second detector are each configured to detect a temperature as the physical quantity.

Also in this case, as in the aforementioned case of detecting the atmospheric pressure, the electric working machine may be configured, for example, such that when the communication adapter is attached, the first detector is positioned at the inlet port or the discharge port for the cooling air of the motor, whereas the second detector is positioned at a different location from the inlet port or the discharge port.

According to such configuration, when the electric working machine operates and enters a state where the cooling air flows into, and is discharged from, the electric working machine, the difference between the detected value of the temperature by the first detector (that is, the detected value of the temperature of the cooling air) and the detected value of the temperature by the second detector (that is, the detected value of the temperature at the portion receiving no, or a little, influence of the cooling air) is larger than that during non-operation of the electric working machine. Thus, it is possible to accurately determine whether the electric working machine is in operation based on the difference, specifically, for example, based on whether the difference is equal to or more than a specified threshold value.

Other Embodiments

While some embodiments to practice the present disclosure have been described above, the present disclosure is not limited to the above-described embodiments but may be practiced in various forms.

(1) It is merely an example that the outer shape of the communication adapter is a generally rectangular parallelepiped shape. The outer shape of the communication adapter, the size and the number of outer surfaces forming the communication adapter may be determined appropriately.

(2) The installation position of the antenna in the communication adapter is not necessarily at an outer surface (for example, the upper surface 7a in the first embodiment) that does not face the surface of the machine body with the recess, among the outer surfaces of the communication adapter. The installation position may be at an outer surface (for example, one of the four side surfaces in the aforementioned first embodiment) that does not face a facing surface with the machine-side IF, among the outer surfaces facing the recess in the machine body.

(3) The elastic supporting portion may be provided to the communication adapter. For example, in the first embodiment, the two elastic supporting portions 42 may be fixedly provided to the communication adapter 7, and the two elastic pressing portions 47 provided to the cover 45 may be fixedly provided to the communication adapter 7.

(4) In the second embodiment and the fourth embodiment, the installation position and the number of the hooks 52 may be modified appropriately.

(5) Each of the cover 45 in the first embodiment and the cover 56 in the third embodiment may be made of any material. For example, a material having a high radio wave permeability may be used in order to reduce radio wave loss. Metal may be used for the cover preferably with through holes in the metal cover as in the third embodiment since metal generally shields radio waves. In the case of using any material other than metal, through holes also may be provided in the cover to reduce radio wave loss. The three slits 57 shown in FIG. 6B are merely an example of through holes provided in the cover.

Also, the plate-shaped cover is merely an example, and a bottomed box-shaped cover or a latticed cover may be used. Further, the cover may have a separate configuration from the electric working machine and the communication adapter as in the first embodiment, or may have a configuration partially secured to the electric working machine as in the third embodiment and not to be detached from the electric working machine during normal use.

Moreover, the communication adapter itself may comprise a member for fixation to the machine body (for example, a plurality of ribs each having a screw hole) and be screw-fastened to the machine body using the ribs.

(6) In the machine body, the recess to which the communication adapter is attached may have two or more surfaces. The first embodiment shows an example of a recess with five surfaces, whereas the fourth embodiment shows an example of a recess with two surfaces.

For example, in FIG. 8A, at least one of the three hooks 52 may be replaced by a wall surface. For example, if the two hooks 52 facing each other in the y-axis direction are replaced by respective wall surfaces, a recess surrounded by four surfaces, i.e., the two wall surfaces, the placement surface 62a, and the wall surface 62b, will be provided.

(7) It is not always required to interpose an elastic member between the recess in the machine body and the communication adapter, or between the communication adapter and the cover. It may be possible to use no elastic member or use at least one elastic member.

(8) Information that the communication adapter can obtain from the electric working machine and wirelessly transmit to other communication device is not limited to the in-operation information described in the aforementioned embodiments. It may be configured to obtain and wirelessly transmit other information indicating conditions of the electric working machine. Examples of the information indicating conditions of the electric working machine include a remaining energy of the battery 17, a use record of the electric working machine, various error information, various setting information, and various information used or generated in the electric working machine.

(9) The dust collector 3 is merely an example of a communication device that performs wireless communication with the communication adapter. It may be configured such that information about the electric working machine is transmitted from the communication adapter to other wirelessly communicable communication device, such as a smartphone and a personal computer.

(10) It may be possible to divide a function of one component in the aforementioned embodiments and reference examples into a plurality of components, or to integrate functions of a plurality of components to one component. Also, at least part of a configuration in the aforementioned embodiments and reference examples may be replaced by a well-known configuration having the same function. Further, part of a configuration in the aforementioned embodiments and reference examples may be omitted. Moreover, at least part of a configuration in the aforementioned embodiments and reference examples may be added to, or replace a configuration in another of the aforementioned embodiments and reference examples. It is to be understood that any forms included in the technical idea defined only by the language recited in the claims may be embodiments of the present disclosure.

What is claimed is:

1. An electric working machine system comprising:
an electric working machine configured to drive a working element by an electric power; and
a communication adapter comprising a plurality of outer surfaces and configured to be attachable to and detachable from the electric working machine,
wherein the electric working machine comprises:
  a recess arranged at an outer surface of the electric working machine and configured for attachment thereto of the communication adapter, the recess comprising at least two facing surfaces, each being configured to face a corresponding one of at least two outer surfaces of the communication adapter when the communication adapter is attached to the recess; and
  a machine-side interface device configured to be electrically coupled to the communication adapter, and
wherein the communication adapter comprises:
  a plurality of outer surfaces comprising the at least two outer surfaces;
  an adapter-side interface device provided at at least one outer surface of the at least two outer surfaces and configured to be electrically coupled to the machine-side interface device of the electric working machine through the at least one outer surface;
  an antenna provided at another at least one outer surface, which is different from the at least one outer surface, among the plurality of outer surfaces, and configured to be capable of transmitting a radio wave for wireless communication with a communication device other than the electric working machine from the another at least one outer surface; and
  a transmission device configured to acquire machine information indicating a state of the electric working machine and to transmit the acquired machine information to the communication device through the antenna,
wherein the electric working machines system further comprises:
  a restriction member configured to restrict detachment of the communication adapter from the recess; and
  an elastic member configured to elastically support the communication adapter by applying an elastic force on at least one of the plurality of outer surfaces so as to force the communication adapter out of the recess,
  wherein the elastic member provided between at least one of the at least two facing surfaces and at least one of the at least two outer surfaces and configured to elastically support the communication adapter with respect to the electric working machine, and
  wherein the restriction member and the elastic member are provided such that the communication adapter abuts the restriction member by the elastic force of the elastic member, and thereby the communication adapter is attached to the recess in a state of receiving the elastic force of the elastic member and a reaction force from the restriction member caused by the elastic force.

2. The electric working machine system according to claim 1, wherein the another at least one outer surface is oriented so as not to face any of the at least two facing surfaces of the recess when the communication adapter is attached to the recess.

3. The electric working machine system according to claim 1,
wherein the restriction member has a plate-shape.

4. The electric working machine system according to claim 3,
wherein the antenna is provided at the one of the plurality of outer surfaces, and
wherein the restriction member comprises a surface area facing the antenna and at least partially comprising at least one through hole.

5. A communication adapter comprising:
a plurality of outer surfaces comprising at least two outer surfaces, each being configured to face a corresponding one of at least two surfaces of a recess for attachment thereto of the communication adapter when the communication adapter is attached to the recess, the recess being provided in an outer surface of an electric working machine, the electric working machine being configured to drive a working element by an electric power;
an interface device provided at at least one outer surface of the at least two outer surfaces, and configured to be electrically coupled to the electric working machine through the at least one outer surface;
an antenna provided at another at least one outer surface, which is different from the at least one outer surface, among the plurality of outer surfaces, and configured to be capable of transmitting a radio wave for wireless communication with a communication device other than the electric working machine from the another at least one outer surface;
a transmission device configured to acquire machine information indicating a state of the electric working machine and to transmit the acquired machine information to the communication device through the antenna;
a supported portion configured to be elastically supported by an elastic member having an elastic force with respect to the electric working machine; and
an abutment portion configured to abut a restriction member configured to restrict detachment of the communication adapter from the recess of the electric working machine by the elastic force of the elastic member, the abutment portion being configured to receive a reaction force from the restriction member caused by the elastic force.

6. The communication adapter according to claim 5,
wherein the another at least one outer surface is oriented so as not to face the recess when the communication adapter is attached to the recess.

7. The communication adapter according to claim 5,
wherein the interface device is configured to be electrically coupled to the electric working machine by a contactless power supply system.

8. The communication adapter according to claim 7,
wherein the electric working machine is configured to be capable of outputting an electric power for operation of the communication adapter to the interface device of the communication adapter by the contactless power supply system, and wherein the communication adapter comprises a power obtaining device configured to obtain the electric power outputted from the electric working machine through the interface device.

9. The communication adapter according to claim 7,
wherein the electric working machine is configured to be capable of outputting the machine information to the interface device of the communication adapter by the contactless power supply system, and
wherein the communication adapter comprises an information acquisition device configured to acquire the machine information outputted from the electric working machine through the interface device.

10. An electric working machine system comprising:
an electric working machine configured to drive a working element by an electric power; and
a communication adapter comprising a plurality of outer surfaces and configured to be attachable to and detachable from the electric working machine,
wherein the electric working machine comprises:
a recess arranged at an outer surface of the electric working machine and configured for attachment thereto of the communication adapter, the recess comprising at least two facing surfaces, each being configured to face a corresponding one of at least two outer surfaces of the communication adapter when the communication adapter is attached to the recess; and
a machine-side interface device configured to be electrically coupled to the communication adapter by a contactless power supply system,
wherein the electric working machine is configured to be capable of outputting an electric power for operation of the communication adapter to the communication adapter by the contactless power supply system,
wherein the communication adapter comprises:
a plurality of outer surfaces comprising the at least two outer surfaces;
an adapter-side interface device provided at at least one outer surface of the at least two outer surfaces and configured to be electrically coupled to the machine-side interface device of the electric working machine through the at least one outer surface by the contactless power supply system;
a power obtaining device configured to obtain the electric power outputted from the electric working machine through the adapter-side interface device;
an antenna provided at another at least one outer surface, which is different from the at least one outer surface, among the plurality of outer surfaces, and configured to be capable of transmitting a radio wave for wireless communication with a communication device other than the electric working machine from the another at least one outer surface; and
a transmission device configured to acquire machine information indicating a state of the electric working machine and to transmit the acquired machine information to the communication device through the antenna.

11. A communication adapter comprising:
a plurality of outer surfaces comprising at least two outer surfaces, each being configured to face a corresponding one of at least two surfaces of a recess for attachment thereto of the communication adapter when the communication adapter is attached to the recess, the recess being provided in an outer surface of an electric working machine, the electric working machine being configured to drive a working element by an electric power;

an interface device provided at at least one outer surface of the at least two outer surfaces, and configured to be electrically coupled to the electric working machine through the at least one outer surface by a contactless power supply system;

an antenna provided at another at least one outer surface, which is different from the at least one outer surface, among the plurality of outer surfaces, and configured to be capable of transmitting a radio wave for wireless communication with a communication device other than the electric working machine from the another at least one outer surface; and a transmission device configured to acquire machine information indicating a state of the electric working machine and to transmit the acquired machine information to the communication device through the antenna, wherein the electric working machine is configured to be capable of outputting an electric power for operation of the communication adapter to the interface portion of the communication adapter by the contactless power supply system, and wherein the communication adapter further comprises a power obtaining device configured to obtain the electric power outputted from the electric working machine through the interface device.

\* \* \* \* \*